United States Patent
Sasaki et al.

[19]

[11] Patent Number: 6,061,391
[45] Date of Patent: May 9, 2000

[54] ERROR INDICATOR, AND DATA MODULATOR-DEMODULATOR AND INDICATING METHOD OF LIGHT EMITTER THEREIN

[75] Inventors: Junko Sasaki; Hiroshi Tanaka, both of Kawasaki, Japan

[73] Assignee: Fujitsu Limited, Kawasaki, Japan

[21] Appl. No.: 08/942,977

[22] Filed: Oct. 2, 1997

[30] Foreign Application Priority Data

Feb. 28, 1997 [JP] Japan ..................................... 9-046404
Feb. 28, 1997 [JP] Japan ..................................... 9-046405

[51] Int. Cl.[7] ................................. H04B 1/38; H04L 5/16
[52] U.S. Cl. ........................ 375/222; 375/221; 375/223; 370/249; 379/5; 371/20.5
[58] Field of Search ..................................... 375/222, 223, 375/221; 370/249; 379/5; 371/20.5

[56] References Cited

U.S. PATENT DOCUMENTS

| | | | |
|---|---|---|---|
| 3,920,975 | 11/1975 | Bass ....................................... | 371/20.5 |
| 4,351,059 | 9/1982 | Gregoire et al. . | |
| 4,398,297 | 8/1983 | Hwang et al. .............................. | 379/28 |
| 4,419,756 | 12/1983 | Cheng-Quispe et al. ............ | 379/93.32 |
| 4,926,352 | 5/1990 | Staffe ...................................... | 364/550 |
| 5,140,625 | 8/1992 | Reum et al. ................................. | 379/5 |
| 5,148,435 | 9/1992 | Ray, Jr. et al. ......................... | 371/20.5 |
| 5,224,149 | 6/1993 | Garcia ......................................... | 379/5 |

FOREIGN PATENT DOCUMENTS

| | | |
|---|---|---|
| 0 139 886 A2 | 5/1985 | European Pat. Off. . |
| 2 209 572 | 5/1989 | United Kingdom . |
| 2 247 118 | 2/1992 | United Kingdom . |
| 2 257 312 | 1/1993 | United Kingdom . |

OTHER PUBLICATIONS

WPI Abstract Accession No. 88–155746/198823 & DE 3639851.

*Primary Examiner*—Stephen Chin
*Assistant Examiner*—Michael W. Maddox
*Attorney, Agent, or Firm*—Armstrong, Westerman, Hattori, McLeland & Naughton

[57] ABSTRACT

An error indicator indicates plural errors with a light emitter. A MPU checks each section in a data modulator-demodulator, and flashes an error LED at a standard cycle when any error occurs. When an user turns ON an error check key in flashing at the standard cycle, the MPU varies a flashing cycle of the error LED in accordance with the detected error. Moreover, a light emitter in a data modulator-demodulator indicates whether a remote loop back test is executed by a trigger from a self-station or from other station. The MPU lights a test LED and shifts the data modulator-demodulator to an execution state when any switch is turned ON. When any of test switches except for local digital/analog loop back test is turned ON, the MPU transmits a test command corresponding to the test switch which is turned ON to other data modulator-demodulator. The other data modulator-demodulator flashes the test LED and is shifted to the execution state corresponding to the received command.

8 Claims, 21 Drawing Sheets

FIG.9

LED FLASHING INTERVAL TABLE

| 00 | FLASHING INTERVAL |
|----|-------------------|
| 01 |                   |
| 02 |                   |
| 04 |                   |
| ≈  | ≈                 |
|    |                   |
| FF |                   |

↑
ERROR ID

FIG.24

LED FLASHING INTERVAL TABLE

| 00 | FLASHING INTERVAL |
|----|-------------------|
| 01 |                   |

ERROR INDICATOR, AND DATA MODULATOR-DEMODULATOR AND INDICATING METHOD OF LIGHT EMITTER THEREIN

BACKGROUND OF THE INVENTION

1. Field of the Invention

The present invention relates to an error indicator indicating an operational error (initial check error) outside by flashing a light emitter, the operational error detected by executing an operational check (initial error check) in a data modulator-demodulator when power is supplied to the data modulator-demodulator. Moreover, the present invention relates to a data modulator-demodulator with a loop back test function as a maintenance function and relates to an indicating method by use of a light emitter.

2. Description of the Related Art

There is an information equipment in which a CPU (Central Processing Unit), a sequencer and the like are installed, and the information equipment executes a self-check regarding whether or not an operational error occurs in an internal circuit and, when an operational error occurs, displays that. Then, for the external display, a display unit is arranged in the information equipment and the display unit is used, and no display unit is arranged in the information equipment and a light emitter (LED (Light Emitting Diode), lamp, or the like) for exclusive use or a light emitter used also as another indicator is used.

However, when a light emitter is used, as mentioned above, there are the following problems. That is, error check items in the information equipment include different things, therefore, it is impossible to specify a kind of an operational error occurrence when indicating that an operational error occurs only by lighting or flashing the light emitter simply. Further, when light emitters of the same number as the error check items are prepared, it becomes possible to specify a kind of an operation error occurrence, however, when plural light emitters are prepared like this, a number of parts increases exceedingly and a hardware scale becomes greater all over the information equipment.

In this respect, it is also possible to vary flashing cycles of light emitters in accordance with kinds of operational errors to make a user know a kind of an operational error occurrence with a light emitter. In this case, however, it is very difficult for the user to distinguish flash cycles of the light emitters and to know a kind of an operational error, unless the user has a reference tool such as a stop watch or is practiced in the operation.

Now, a data modulator-demodulator (modem) converts digital data outputted from a digital terminal equipment (DTE) into an analog signal and transmits the analog signal to a receiving data modulator-demodulator via communication lines, and further converts an analog signal transmitted from a transmitting data modulator-demodulator into digital data, and the digital data is inputted into the DTE.

Conventionally, such a data modulator-demodulator has a loop back test function for checking whether there is a fault in internal data transmission paths therein and/or in data transmission paths to the receiving data modulator-demodulator or not. This loop back test function sets a loop in data paths of the transmitting data modulator-demodulator and/or in those of the receiving data modulator-demodulator, transmits a test pattern from a checker connected to the transmitting data modulator-demodulator and/or from that connected to the receiving data modulator-demodulator, compares the test pattern which returns via the loop with the original test pattern, and judges that a fault occurs in the data transmission data path from the checker to the loop when both patterns are different.

A local loop back test in that a loop is set in the data modulator-demodulator at a self-station and a test pattern is transmitted from the checker connected to the self station, needless to say, starts by a start instruction signal (trigger) inputted from the data modulator-demodulator at the self-station. On the contrary, a remote loop back test in that a loop is set in the data modulator-demodulator at one of the stations and a test pattern is transmitted from the checker connected to other station, starts by inputting a start instruction signal (trigger) into the data modulator-demodulator at the one station and by transmitting a test command from the one station to the other station, or by inputting a start instruction signal (trigger) into the data modulator-demodulator at the other station and by transmitting a test command from the other station to the one station.

In many cases, the data modulator-demodulator has a light emitter (LED: Light Emitting Diode) which lights to show that the loop back test is executed. When the remote loop back test is executed, both the light emitters of the data modulator-demodulator at the transmitting (self) station and at the receiving (other) station light to show that the loop back test is executed therein.

Thus, it is possible to know that the loop back test is currently executed based on the lighting conditions of light emitters, however, it is impossible to know through which data modulator-demodulator a trigger is inputted to start the remote loop back test.

SUMMARY OF THE INVENTION

The present invention is achieved in view of the above-described problems, therefore, it is an object thereof to provide an error indicator in which one light emitter can indicate occurrences of operational errors so as to distinguish plural kinds of operational errors by flashing the light emitter in a manner that a user can distinguish flashing cycles without the need for a special standard tool.

Moreover, the present invention is achieved in view of the above-described problems, therefore, it is an object thereof to provide a data modulator-demodulator and a display method of a light emitter therein in which one light emitter can indicate whether a remote loop back test is executed based on a trigger from a data modulator-demodulator in a self-station or from that in another station.

Each aspect of the present invention is achieved to solve the above-described problems.

That is, the first aspect of the present invention is an error indicator indicating an operational error of information equipment. This error indicator comprises a light emitter arranged on the information equipment, an operational state monitoring device monitoring an operational state of each section in the information equipment and detecting whether or not the operational error occurs and the kind of the operational error which occurs, an operating member in one of a first condition and a second condition, and a flashing control section starting when the operational error is detected by the operational state monitoring device, and flashing the light emitter at a predetermined standard cycle if the operating member is in the first condition, or at a flashing cycle corresponding previously to the kind of the operational error detected by the operational state monitoring device if the operating member is in the second condition.

The error indicator is structured, whereby the operational state monitoring device monitors an operational state of each section in the information equipment, detects whether or not the operational error occurs, and detects a kind of the operational error when any operational error is detected. When the operational state monitoring device detects that any operational error occurs, the flashing control section flashes the light emitter in accordance with a condition of the operating member. The flashing control section flashes the light emitter at a standard cycle when the operating member is in the first condition. On the contrary, when the operating member is in the second condition, the flashing control section lights the light emitter at a flashing cycle previously corresponded to the kind of the operational error in accordance with the kind of the operational error detected by the operational state monitoring device. As a result, the user can compare the flashing cycle (standard cycle) in a case that the operating member is in the first condition with the flashing cycle in a case that the operating member is in the second condition, and the user can know the kind of the operational error which is detected based on whether the latter is longer than the former or not.

This light emitter may be a lamp or a light emitting diode.

The operating member may be a two-position switch which is stable in the first condition and in the second condition or may be a switch which is in the first condition usually and becomes the second condition only when operated. This switch may be a button, a slide switch or a lever.

A combination of flashing cycles previously corresponded to the kinds of the operational errors may include two or three cycles among a cycle shorter than the standard cycle, a cycle equal to the standard cycle and a cycle longer than the standard cycle.

Correspondence between kinds of operational errors and flashing cycles may set so as not to be changed by an user or so as to be changed by an user.

The second aspect of the present invention is characterized in that the operating member is in the first condition usually and, only when said operating member is operated, becomes in the second condition.

The third aspect of the present invention further comprises a table in which each kind of the operational error is corresponded to any flashing cycle in addition to the first aspect, and is characterized in that the control section, when the operating member is in the second condition, reads the flashing cycle corresponded to the kind of the operational error detected by the operational monitoring device from the table.

The fourth aspect of the present invention is characterized in that the flashing cycle corresponded to the kind of the operational error in the first aspect includes a cycle shorter than the standard cycle or another cycle longer than the standard cycle.

The fifth aspect of the present invention is a data modulator-demodulator executing a remote loop back test with another data modulator-demodulator. This data modulator-demodulator comprises a light emitter, an input section through which an instruction signal for executing the remote loop back test is inputted when operated, a transmission section transmitting an instruction information for executing the remote loop back test to the other data modulator-demodulator when the instruction signal is inputted through the input section, a receiving section receiving the instruction information transmitted from the transmission section of the other data modulator-demodulator, a loop back test execution section executing the remote loop back test with the other data modulator-demodulator when the instruction signal is inputted through the input section and when the receiving section receives the instruction information, and a light emitter control section lighting the light emitter when the instruction signal is inputted through the input section and making the light emitter flash when the receiving section receives the instruction information.

According to this structure, the instruction signal for executing the remote loop back test is inputted through the input section in accordance with the external operation. When the instruction signal is inputted through the input section in this way, the transmission section transmits the instruction information for executing the remote loop back test to the other data modulator-demodulator, the loop back test execution section executes the remote loop back test with the other data modulator-demodulator, and the light emitter control section lights the light emitter. The receiving section receives the instruction information for executing the remote loop back test from the other data modulator-demodulator. When the receiving section receives the instruction information, the loop back test execution section executes the remote loop back test with the other data modulator-demodulator, and the light emitter control section makes the light emitter flash. Thus, the user can easily determine whether the loop back test between stations by the loop back test execution section in the self-station is caused by the instruction signal inputted through the input section in the self-station or caused by the instruction signal inputted through the input section in the other station based on the lighting/flashing of the light emitter.

The input section may be a mechanical switch provided with the data modulator-demodulator or may be a function receiving a command from a digital terminal connected to the data modulator-demodulator. Additionally, when a mechanical switch is used as the input section, plural mechanical switch are arranged in accordance with kinds of loop back tests.

The sixth aspect of the present invention is characterized in that the input section is a switch generating the instruction signal when operated.

The seventh aspect of the present invention is characterized in that the light emitter control section in the fifth aspect is provided with a memory area in which a flashing cycles of the light emitter are written rewritably and flashes the light emitter in accordance with the flashing cycles written in the memory area when the receiving section receives the instruction information.

The eighth aspect of the present invention is a data modulator-demodulator executing a remote loop back test with another data modulator-demodulator and a local loop back test selectively. This data modulator-demodulator comprises a light emitter, an input section through which an instruction signal for executing the remote loop back test and other instruction signal for executing the local loop back test are inputted when operated, a transmission section transmitting instruction information for executing the remote loop back test to the other data modulator-demodulator when the instruction signal for executing the remote loop back test is inputted through the input section, a receiving section receiving the instruction information transmitted from the transmission section of the other data modulator-demodulator, a remote loop back test execution section executing the remote loop back test with the other data modulator-demodulator when the instruction signal for executing the remote loop back test is inputted through the input section and when the receiving section receives the instruction information, a local loop back test execution section executing the local loop back test when the instruction signal for executing the local loop back test is inputted through the input section, and a light emitter control section lighting the light emitter when the instruction signal for executing the remote loop back test or the local instruction signal for executing the local loop back test is inputted through the input section and making the light emitter flash when the receiving section receives the instruction information.

According to the eighth aspect, an instruction signal for executing the remote loop back test and an instruction signal for local executing the loop back test are inputted through the input section in accordance with an external operation. When an instruction signal for executing the local loop back test is inputted through the input section, the local loop back test execution section executes the local loop back test and the light emitter control section lights the light emitter. When an instruction signal for executing the remote loop back test is inputted through the input section, the transmission section transmits the instruction information for executing the remote loop back test to the other data modulator-demodulator, the remote loop back test execution section executes the remote loop back test with the other data modulator-demodulator, and the light emitter control section lights the light emitter. The receiving section receives the instruction information for executing the remote loop back test from the other data modulator-demodulator. When this receiving section receives the instruction information, the remote loop back test execution section executes the remote loop back test with the other data modulator-demodulator, and the light emitter control section makes the light emitter flash. Thus, the user can easily determine the loop back process executed by the loop back process execution section in the self-station as the local loop back test, the remote loop back test caused by the instruction signal inputted through the input section in the self-station or the remote loop back test caused by the instruction signal inputted through the input section in the other station based on lighting/flashing of the light emitter.

The ninth aspect of the present invention is an indicating method by use of a light emitter in a data modulator-demodulator with a loop back test execution section executing a remote loop back test with other data modulator-demodulator. This method comprises a step of transmitting instruction information for executing the remote loop back test to the other data modulator-demodulator when an instruction signal for executing the remote loop back test is inputted, and a step of lighting the light emitter when the instruction signal is inputted or making the light emitter flash when the instruction information is received from the other data modulator-demodulator.

According to the ninth aspect, the user can easily determine whether the remote loop back process executed by the loop back process execution section in the self-station is caused by the instruction signal inputted through the input section in the self-station or caused by the instruction signal inputted through the input section in the other station based on the lighting/flashing of the light emitter.

BRIEF DESCRIPTION OF THE DRAWINGS

Other objects and advantages of the present invention will become apparent during the following discussion conjunction with the accompanying drawings, in which:

FIG. 9 is a structural view of a LED flashing interval table stored in the $E^2ROM$ 13 in FIG. 7;

FIG. 24 is a structural view of a LED flashing interval table stored in the $E^2ROM$ 13a in FIG. 22.

DETAILED DESCRIPTION OF THE PREFERRED EMBODIMENTS

Preferred aspects and embodiments of the present invention will now be described with reference to the accompanying drawings.

Explanations will be given of embodiments in which an error indicator is integrated into a data modulator-demodulator (modem) according to the present invention.

<First Principle>

Figure 1:
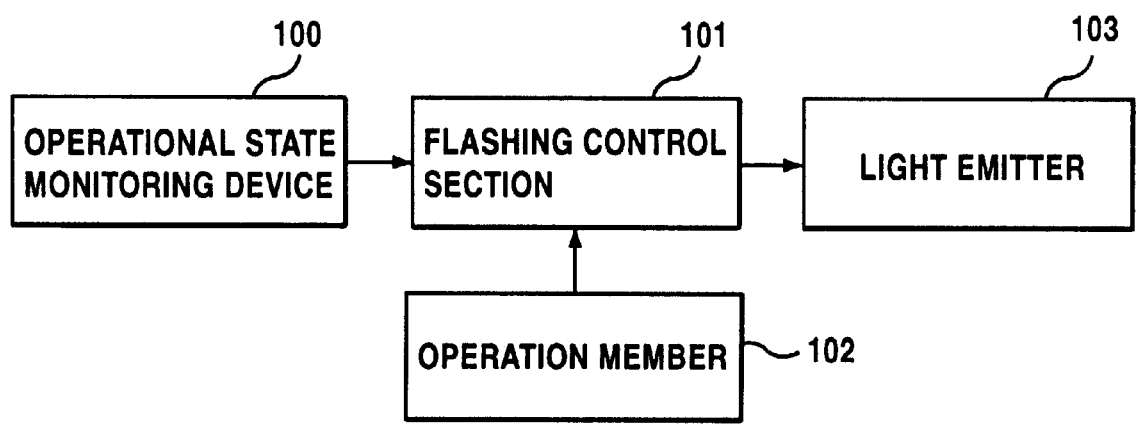
FIG. 1 is a view illustrating a principle of the present invention.

The first principle of the present invention, as shown in FIG. 1, is an error indicator indicating an operational error in information equipment. This error indicator comprises a light emitter arranged on the information equipment 103, an operational state monitoring device 100 monitoring an operational state of each section in the information equipment and detecting whether the operational error occurs or not and a kind of the operational error which occurs, an operating member 102 in one of a first condition and a second condition, and a flashing control section 101 starting when the operational error is detected by the operational state monitoring device, and flashing the light emitter at a predetermined standard cycle if the operating member is in the first condition, or at a flashing cycle corresponding previously corresponded to the kind of the operational error detected by the operational state monitoring device if the operating member is in the second condition.

The error indicator is structured in this like, whereby the operational state monitoring device 100 monitors an operational state of each section in the information equipment, detects whether the operational error occurs or not, and detects a kind of the operational error when any operational error is detected. When the operational state monitoring device 100 detects that any operational error occurs, the flashing control section 101 makes the light emitter 103 flash in accordance with a condition of the operating member. Concretely, the flashing control section 101 makes the light emitter flash at a standard cycle when the operating member 102 is in the first condition. On the contrary, when the operating member 102 is in the second condition, the flashing control section 101 lights the light emitter 103 at a flashing cycle corresponding previously to the kind of the operational error in accordance with the kind of the operational error detected by the operational state monitoring device 100. As a result, the user can compare the flashing cycle (standard cycle) in a case that the operating member 102 is in the first condition with the flashing cycle in a case that the operating member 102 is in the second condition, and the user can know the kind of the operational error detected based on whether or not the latter is longer than the former.

<First Embodiment>

(Hardware Configuration of Data Modulator-Demodulator)

Figure 2:
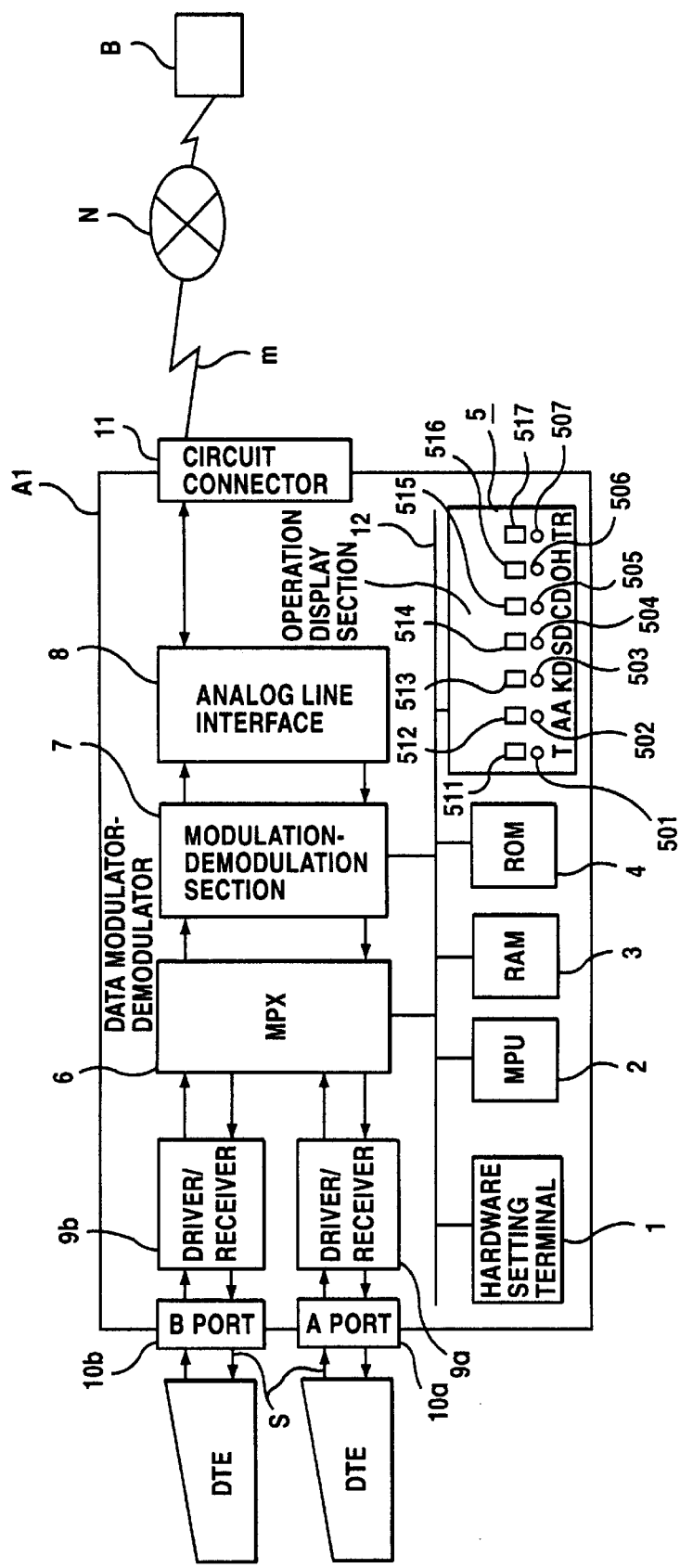
FIG. 2 is a block diagram illustrating a hardware configuration of a data modulator-demodulator of the first embodiment according to the present invention.

FIG. 2 is a block diagram illustrating a circuit structure in a data modulator-demodulator A1 according to the first embodiment and connection conditions to external equipments. As shown in FIG. 2, the data modulator-demodulator A1 is connected to plural digital terminal equipments (DTE) via serial cables s and to an analog network N via a circuit m. The data modulator-demodulator A1 converts digital data outputted from each DTE into an analog signal, and then transmits the analog signal to other data modulator-demodulator B via the analog network N. The data modulator-demodulator A1 converts the analog signal received from the other data modulator-demodulator B via the analog network N into a digital signal, and then outputs the digital signal to an addressed DTE.

This data modulator-demodulator is provided with plural ports (A port 10a, B port 10b) respectively connected to DTEs, plural driver/receivers 9a, 9b correspondingly connected to the ports 10a, 10b, a multiplexer (MPX) 6 connected to the driver/receivers 9a, 9b, a modulation-demodulation section 7 connected to the MPX 6, an analog line interface 8 connected to the modulation-demodulation section 7, a circuit connecter 11 connected to the analog line interface 8, and a hardware setting terminal 1, a MPU (Micro Processor Unit) 2, a RAM (Random Access Memory) 3, a ROM (Read Only Memory) 4 and an operation display section 5 which are connected to the MPX 6 and the modulation-demodulation section 7 via a bus 12.

Each port (A port 10a, B port 10b) is a connector to which the serial cable s linking to the DTE is connected.

Each driver/receiver 9a, 9b is an interface unit for transmitting/receiving data between each port (A port 10a, B port 10b) and the MPX 6 while suiting a data format logically and electrically in accordance with an interface (such as V. 35 and X. 21) at the connection side.

The MPX 6 controls each driver/receiver 9a, 9b. The MPX 6 converts the serial digital signal received from each driver/receiver 9a, 9b to a speed corresponding to the communication speed set by the MPU 2 and transmits the converted serial digital signal to the modulation-demodulation section 7, and transmits the serial digital signal received from the modulation-demodulation section 7 to the corresponding driver/receiver 9a, 9b. The MPX 6 also transmits a command received via the modulation-demodulation section 7, issued from the other data modulator-demodulator B and addressed to the MPU 2 to the MPU 2 via the bus 12. The MPX 6 also transmits a command received from the MPU 2 and addressed to the other data modulator-demodulator B to the modulation-demodulation section 7.

The modulation-demodulation section 7 carries out frequency modulation and phase modulation based on the serial digital signal received from the MPU 6, and transmits an analog signal obtained by the modulation to the analog line interface 8. The modulation-demodulation section 7 also carries out demodulation (cycle detection) based on the analog signal received from the analog line interface 8 and transmits a serial digital signal obtained by the demodulation to the MPX 6.

The analog line interface 8 connects a signal line for receiving an analog signal from the modulation-demodulation section 7 and a signal line for transmitting an analog signal to the modulation-demodulation section 7 with a signal line connected to the circuit connector 11, and separately controls currents of up and down analog signals (an analog signal transmitted from the modulation-demodulation section 7 to the circuit connector 11 and an analog signal transmitted from the circuit connector 11 to the modulation-demodulation section 7).

The hardware setting terminal 1 includes a plurality of switches for setting the operational state all over the data modulator-demodulator A1.

The operation display section 5 is provided with seven LEDs 501–507 and seven switches 511–517 attached to the frame surface of the data modulator-demodulator. The operation display section 5 shows various information by lighting (flashing) each LED 501–507 based on instructions from the MPU 2, and various information is inputted to the MPU 2 based on the operational state of each switch 511–517.

Each LED 501–507 shows information as follows. That is, the LED 501 acts as a light emitter for operational error instruction, and lights to show that the initial check is executed by the MPU 2 and flashes to show that an operational error (initial check error) occurs (hereinafter, the LED 501 is called "error LED"). Incidentally, the operational error is detected by executing an initial error check when a power is supplied to the data modulator-demodulator. Further, the LED 502 lights to show that the data modulator-demodulator A1 is set as automatic receiving. The LED 503 flashes to show that the data modulator-demodulator A1 transmits data to the DTE. The LED 504 flashes to show that the DTE transmits data to the data modulator-demodulator A1. The LED 505 flashes to show that the data modulator-demodulator A1 is in communication state. The LED 506 lights to show that a circuit is connected. The LED 507 flashes to show that the DTE is already prepared to start communication.

Moreover, the switch 511 as an operating member is operated by a user while the error LED flashes, and a command for varying a flashing cycle of the error LED is inputted based on a kind of an error which occurs to the MPU 2 (hereinafter, the switch 511 is called "error check key"). Further, the other switches 512–517, when operated by the user, input respective commands to carry out corresponding loop back tests to the MPU 2.

The ROM 4 stores a firmware executed by the MPU 2. Detail explanation will be given of the firmware later.

The MPU 2 is a processor for controlling all over the data modulator-demodulator A1, and controls operations in the MPX 6 and the modulation-demodulation section 7 based on setting by the hardware setting terminal 1. The MPU 2, when a main power is supplied by a power unit not shown, executes operational check (initial error check) of each portion in the data modulator-demodulator A1. The MPU 2, when a command from the other data modulator-demodulator B is notified by the MPX 6, writes the command into the RAM 3 by an interrupt process and carries out a process corresponding to the command at a predetermined timing. The MPU 2, when each switch 511–517 in the operation display section 5 is operated, acts in accordance with the operation. The MPU 2 instructs the operation display section 5 to make each LED 501–507 light based on the operation in the data modulator-demodulator A1.

A working area is expanded in the RAM 3 by the MPU 2.

(Structure of Firmware)

Figure 3:
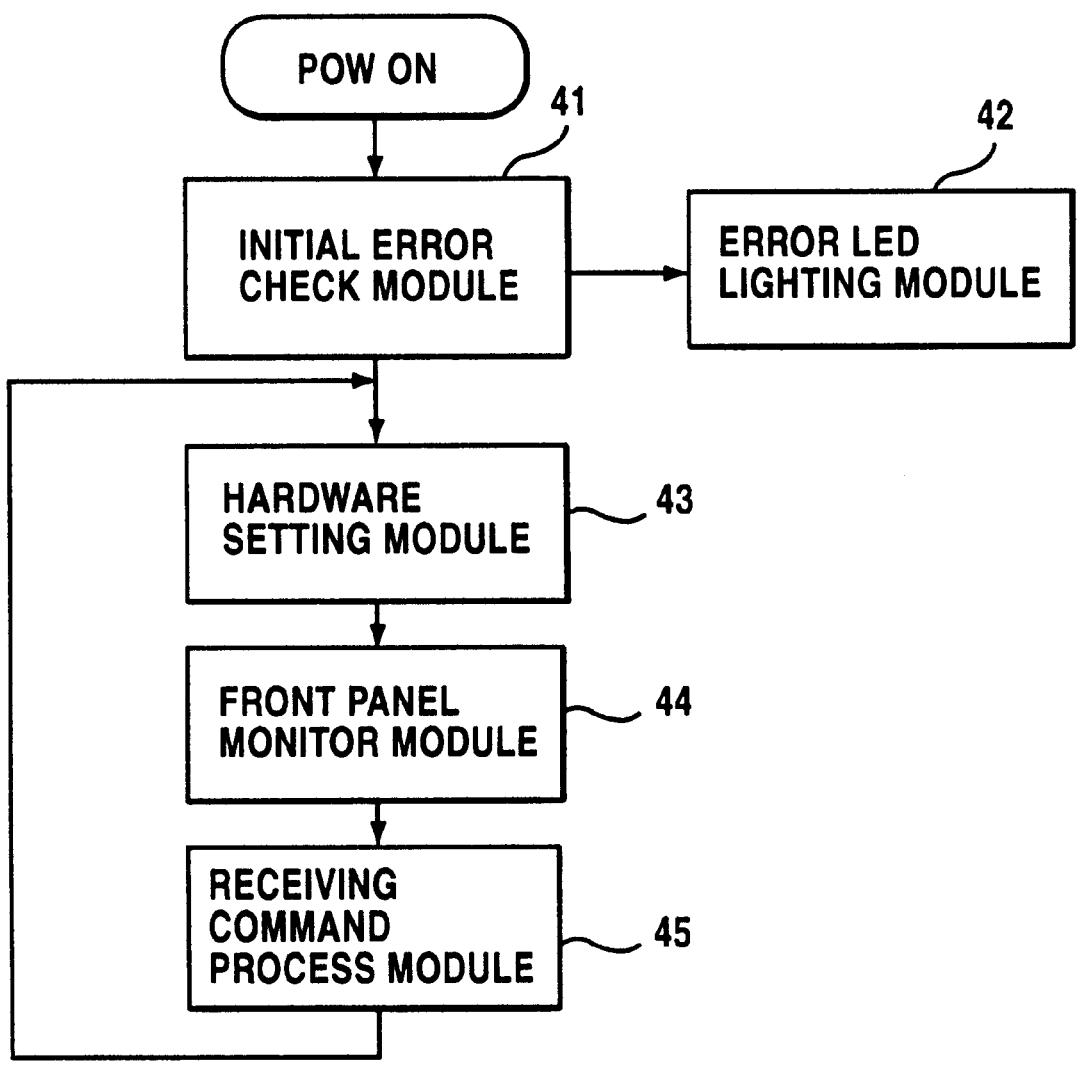
FIG. 3 is a structural view of a firmware stored in the ROM 4 in FIG. 2.

Next, an explanation is given of the outline structure of the firmware stored in the ROM 4. As shown in FIG. 3, the firmware in the ROM 4 includes a plurality of modules (an initial error check module 41, a hardware setting module 43, a front panel monitor module 44, a receiving command process module 45, and an error LED module 42).

Figure 6:
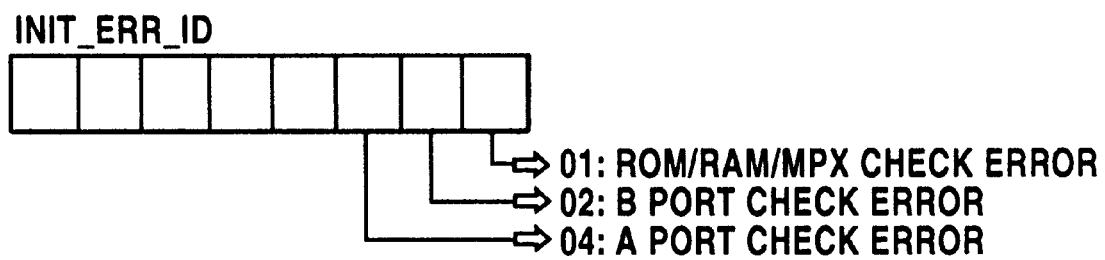
FIG. 6 is a structural view of an initial error ID.

The initial error check module 41 as an operational state monitor section starts by turning on the main power in the data modulator-demodulator A1 and checks the operational state of each section in the data modulator-demodulator A1. The initial error check module 41, when any operational error occurs, calls the error LED module 42, and, when no operational error occurs, turns the process to the hardware setting module 43. Items checked by the initial error check module 41 are (1) operational error checks in the RAM 3, the ROM 4 and the MPX 6, (2) a B port control check by the MPX 6 (a check relating to the control of the B port 10*b* executed in the MPX 6), and (3) a A port control check by the MPX 6 (a check relating to the control of the A port 10*a* executed in the MPX 6). When the initial error check module 41 calls the error LED lighting module 42, the initial error check module 41, to notify the error LED lighting module 42 of a kind of the operational error, writes a parameter (initial error ID) shown in FIG. 6 into the RAM 3. In the parameter, a bit of a weight "01" shows whether an occurring error is an operational error in one of the RAM 3, the ROM 4 and the MPX 6 (=1) or not (=0). A bit of weight "02" shows whether an occurring error is a B port control error of the MPX 6 (=1) or not (=0). A bit of weight "03" shows whether an occurring error is an A port control error of the MPX 6 (=1) or not (=0).

The error LED lighting module 42 as a flashing control section, when read from the initial error check module 41, first, flashes the error LED 501 at a standard cycle (500×2 ms), and, when the error check key 511 is turned ON, flashes the error LED 501 at a cycle corresponding to a kind of the error shown by a parameter (FIG. 6) written in the RAM 3 (200×2 ms in cases of operation errors in the RAM 3, the ROM 4 and the MPX 6, 500×2 ms in a case of a B port control error of the MPX 6, 800×2 ms in a case of a A port control error of the MPX 6).

The hardware setting module 43 monitors a setting condition of the hardware setting terminal 1, and instructs the MPX 6 and the modulation-demodulation section 7 to vary the operational state in accordance with the setting condition. When necessary instructions are finished in the hardware setting module 43, the process starts in the front panel monitor module 44.

The front panel monitor module 44 monitors an operation state of each of the switches 512–517 in the operation display section 5, and, when any of the switches 512–517 is ON, executes a loop back test corresponding to one of the switches 512–517 turned ON. When necessary loop back tests are finished in the front panel monitor module 44, the process starts in the receiving command process module 45.

The receiving command process module 45 monitors whether the command notified from the other data modulator-demodulator B is written in the RAM 3 by the MPX 6 or not, and, when any command is written in the RAM 3, carries out a process corresponding to this command. When necessary processes are finished in the receiving command process module 45, the process starts in the hardware setting module 43.

(Process of Initial Error Check Module)

Figure 4:
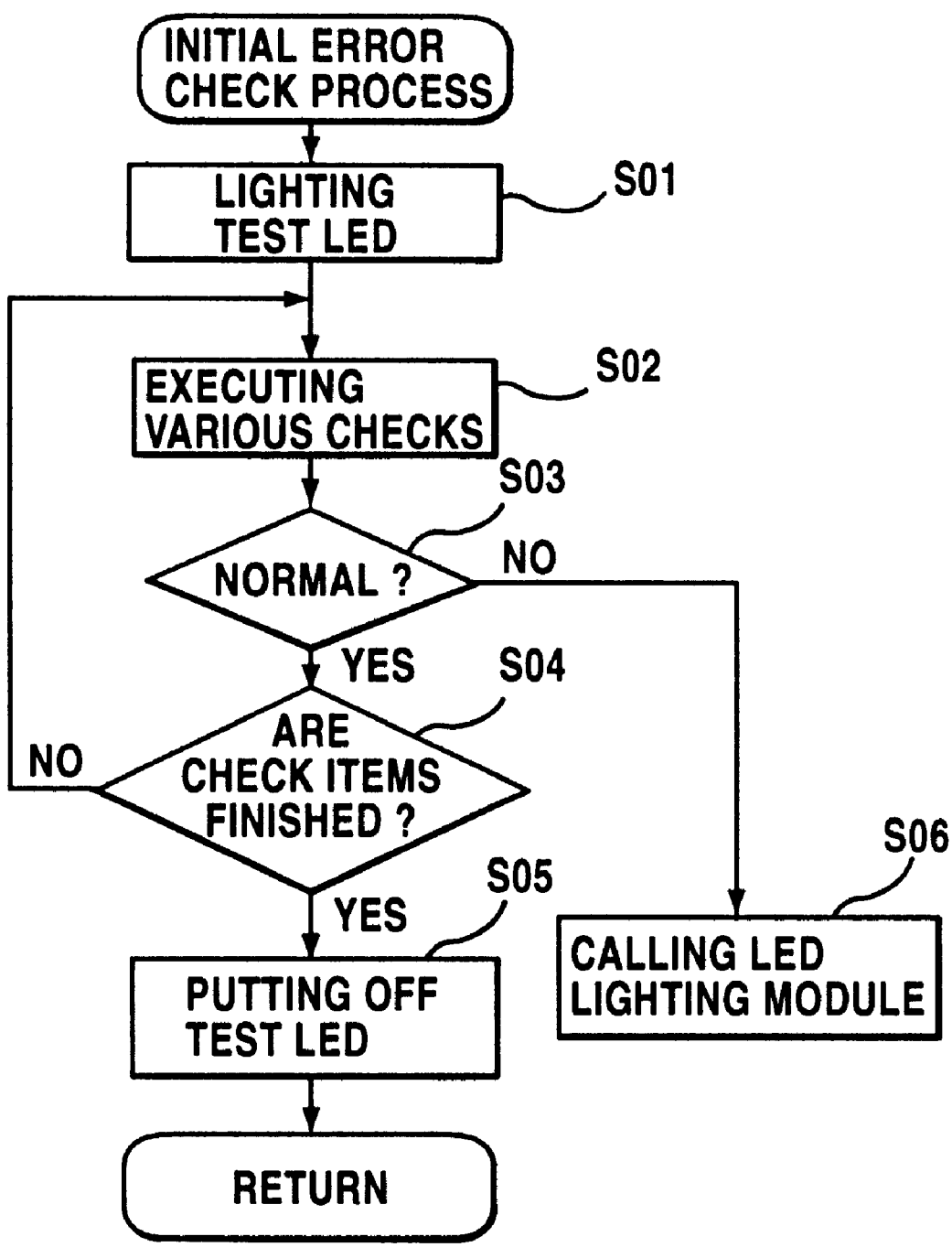
FIG. 4 is a flow chart illustrating an initial error check process executed by the MPU 2 which reads the initial error check module in FIG. 3.

Next, an explanation is given of the initial error check process executed in the MPU 2 which reads the initial error check module 41 with reference to FIG. 4.

In the initial step S01 after starting, the MPU 2 lights the test LED 501.

In the next step S02, the MPU 2 carries out an error check in the above-mentioned items.

In the next step S03, the MPU 2 determines whether the hardware corresponding to the item operates normally or an operational error occurs based on the result of the error check carried out in the step S02. When it is determined that the hardware operates normally, the process starts in the step S04.

In the step S04, it is determined whether the error checks of all items are finished. When the error checks are not finished as to all items, the process returns to the step S02.

After the loop process between the step S02 and the step S04 is repeated, when it is determined that the error checks of all items are finished in the step S04, the process starts in the step S05. In the step S05, the MPU 2 puts out the error LED 501. Then, the MPU 2 starts the process in the hardware setting module.

On the contrary, in the loop process between the step S02 and the step S04, when it is determined that the operational error occurs in the step S03, the MPU 2 advances the process to the step S06. In the step S06, the MPU 2 writes a parameter (initial error ID) in which a bit corresponding to the kind of the operational error which occurs, and then calls the error LED lighting module 42.

(Process of Error LED Lighting Module)

Figure 5:
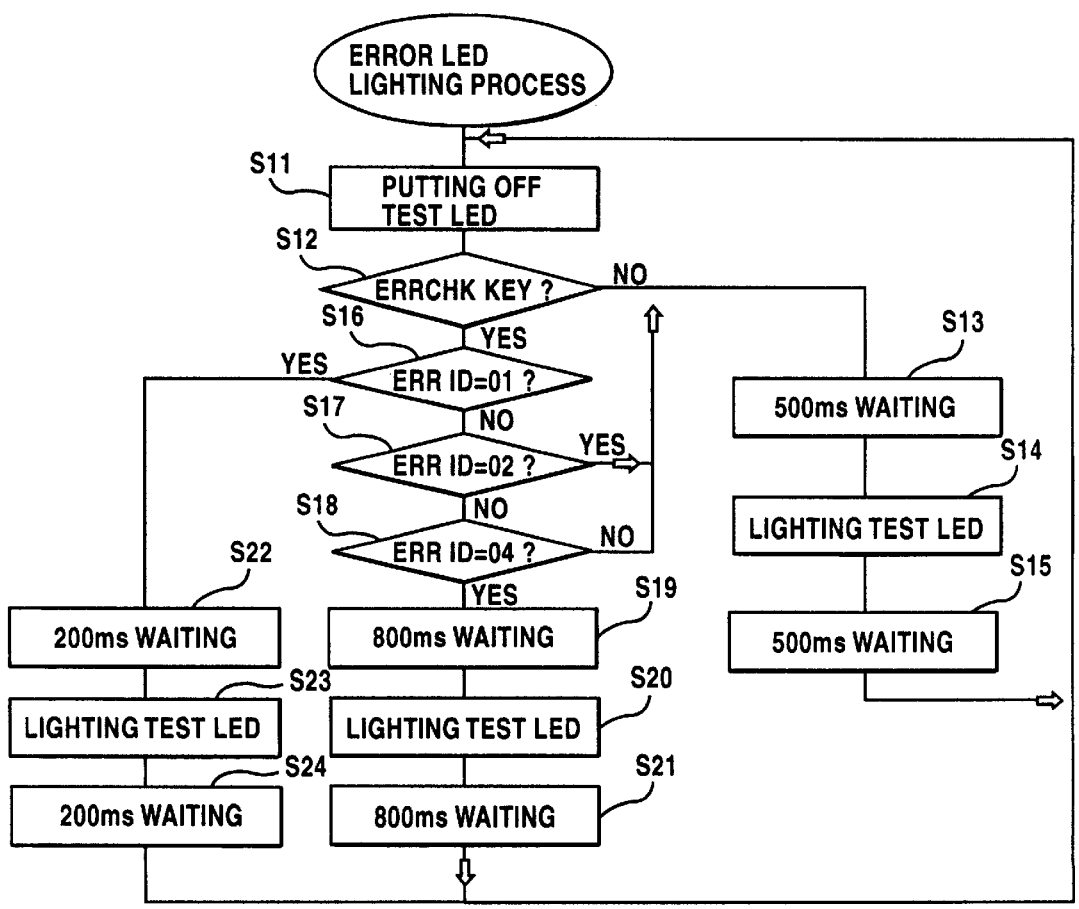
FIG. 5 is a flow chart illustrating an error LED lighting process executed by the MPU 2 which reads the error LED lighting module in FIG. 3.

Next, an explanation is given of the error LED lighting process executed by the MPU 2 which reads the error LED lighting module 42 with reference to FIG. 5.

In the initial step S11 after starting, the MPU 2 puts off the test LED 501.

In the next step S12, the MPU 2 checks whether the error check key 511 is turned ON or not. When the error check key 511 is ON (namely, the first condition), the MPU 2 waits for 500 ms in the step S13.

In the step S14 after passing 500 ms, the MPU 2 lights the test LED 501.

In the next step S15, the MPU 2 waits for 500 ms. After passing 500 ms, the MPU 2 returns the process to the step S11 and put off the test LED 501.

On the contrary, when it is determined that the error check key is turned ON (namely, the second condition), the MPU 2 checks whether the bit of the weight "01" in the parameter (initial error ID) is set to "1" or not in the step S16. When the bit of the weight "01" is set to "1", namely, when an operational error occurs in the RAM 3, the ROM 4 or the MPX 6, the MPU 2 waits for 200 ms in the step S22.

In the step S23 carried out after passing 200 ms, the MPU 2 lights the test LED 501.

In the next step S24, the MPU 2 waits for 200 ms. After passing 200 ms, the MPU 2 returns the process to the step S11, and puts off the test LED 501.

On the contrary, when it is not determined that the bit of the weight "01" in the parameter (initial error ID) is set to "1" or not in the step S16, the MPU 2 checks whether the bit of the weight "02" in the parameter (initial error ID) is set to "1" or not in the step S17. When the bit of the weight "02" is set to "1", namely, when the B port control error of the MPX 6 occurs, the MPU 2 waits for 500 ms in the step S13.

In the step S14 carried out after passing 500 ms, the MPU 2 lights the test LED 501.

In the next step S15, the MPU 2 waits for 500 ms. After passing 500 ms, the MPU 2 returns the process to the step S11, and puts off the test LED 501.

On the contrary, when it is not determined that the bit of the weight "02" in the parameter (initial error ID) is set to "1" in the step S17, the MPU 2 checks whether the bit of the weight "04" in the parameter (initial error ID) is set to "1" or not in the step S18. When the bit of the weight "04" is set to "1", namely, when the A port control error of the MPX 6 occurs, the MPU 2 waits for 800 ms in the step S19.

In the step S20 carried out after 800 ms, the MPU 2 lights the test LED 501.

In the next step S21, the MPU 2 waits for 800 ms. After 800 ms, the MPU 2 returns the process to the step S11, and puts off the test LED 501.

Additionally, when it is not determined that the bit of the weight "04" in the parameter (initial error ID) is set to "1" in the step S17, the MPU 2 advances the process to the step S13.

The MPU 2 repeated the above-mentioned loop process when the main power supply of the data modulator-demodulator A1 is cut off.

(Operation of First Embodiment)

In the first embodiment, immediately after turning ON the power supply of the data modulator-demodulator A1, the MPU 2 carries out the initial check of each item by the initial error check module 41. While the initial error check is carried out, the MPU 2 keeps lighting the error LED 501.

As a result of this initial error check, when it is detected that an operational error occurs, the MPU 2 keeps flashing the error LED 501 at the standard cycle (500×2 ms) by the error LED lighting module 42 (S11, S13–S15).

When the error LED 501 is kept flashing at the standard cycle (500×2 ms), the user turns ON the error check key 511, the MPU 2 varies the flashing cycle of the error LED 501 in accordance with the kind of the error item shown in the parameter (initial error ID) written in the RAM 3. Concretely, when an operational error occurs in the RAM 3, the ROM 4 and/or the MPX 6, the error LED 501 flashes at a cycle (200×2 ms) shorter than the standard cycle (500×2 ms) (S22–S24, S11), when a A port control error of the MPX 6 occurs, the error LED 501 flashes at a cycle (800×2 ms) longer than the standard cycle (500×2 ms) (S19–S21, S11), and when a B port control error of the MPX 6 occurs, the error LED 501 flashes at a cycle equal to the standard cycle (500×2 ms) (S13–S15, S11). When the user turns OFF the error check key 511, the MPU 2 returns the flashing cycle of the error LED 501 to the standard cycle (500×2 ms).

Thus, the user can distinguish the item of the detected operational error only by comparing the flashing cycles before and after turning ON the error check key 511. That is, when the flashing cycles of the error check key 511 after turning ON the error check key 511 is shorter than that before turning ON the error check key 511, it is possible to know that an operational error occurs in the RAM 3, the ROM 4 and/or the MPX 6. When the flashing cycles of the error check key 511 after turning ON is longer than that before turning ON the error check key 511, it is possible to know that the A port control error of the MPX 6 occurs. When the flashing cycles after turning ON the error check key 511 is equal to that before turning ON, it is possible to know that the B port control error of the MPX 6 occurs.

In this way, though there are differences among individuals as to feeling such as each cycle is "short" or "long", the feeling can be standardized among individuals by comparing each cycle with the standard cycle. As a result, though the user does not carry a special reference such as a stop watch, the user can distinguish the kind of the operational error which occurs by distinguishing the length of the flashing cycle of one error LED 501.

<Second Embodiment>

The second embodiment of the present invention is different from the first embodiment in a respect that an user can set a flashing cycle corresponding to an item of a detected operational error freely in accordance with the user's feeling.

(Hardware Configuration of Data Modulator-Demodulator)

Figure 7:
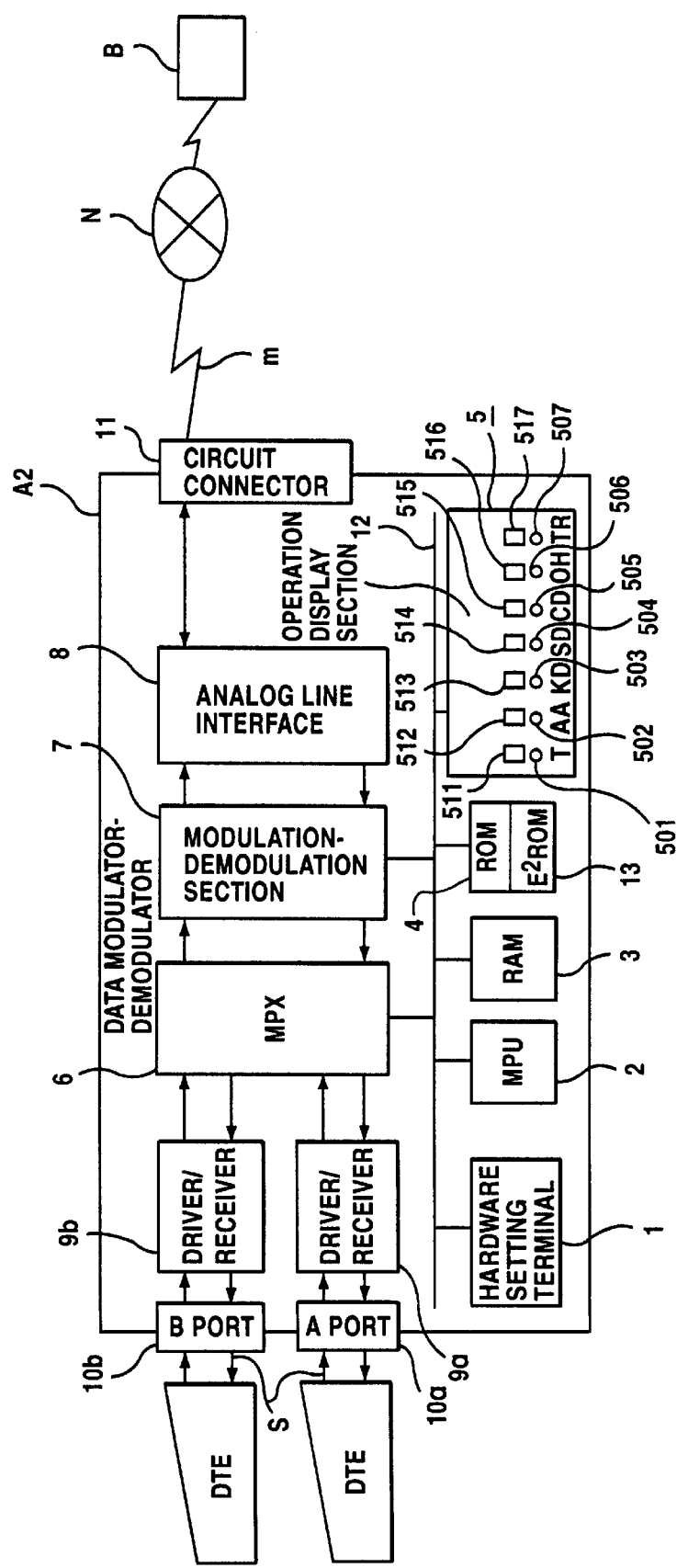
FIG. 7 is a block diagram illustrating a hardware configuration of a data modulator-demodulator of the second embodiment according to the present invention.

FIG. 7 is a block diagram illustrating a circuit structure of an data modulator-demodulator A2 of the second embodiment and connections with external devices. As shown in FIG. 7, the data modulator-demodulator A2 of the second embodiment is different from that of the first embodiment only in a point that a E$^2$ROM 13 is connected to the bus 12.

FIG. 9 illustrates a structure of a LED lighting interval table made by the user and written in the E$^2$ROM 13. As shown in FIG. 9, the LED lighting interval table is structured so that the user can write flashing intervals (flashing cycles) to match them with errors ID (01-FF) respectively corresponding to the bits included in the parameter (initial error ID) and an error ID (00) corresponding to a reference value.

The MPU 2 writes and updates flashing intervals (flashing cycles) into the LED lighting interval table based on a command from the DTE.

Others in the second embodiment are similar to those in the second embodiment, therefore, explanations are omitted of the others.

(Process of Error LED Lighting Module)

Figure 8:
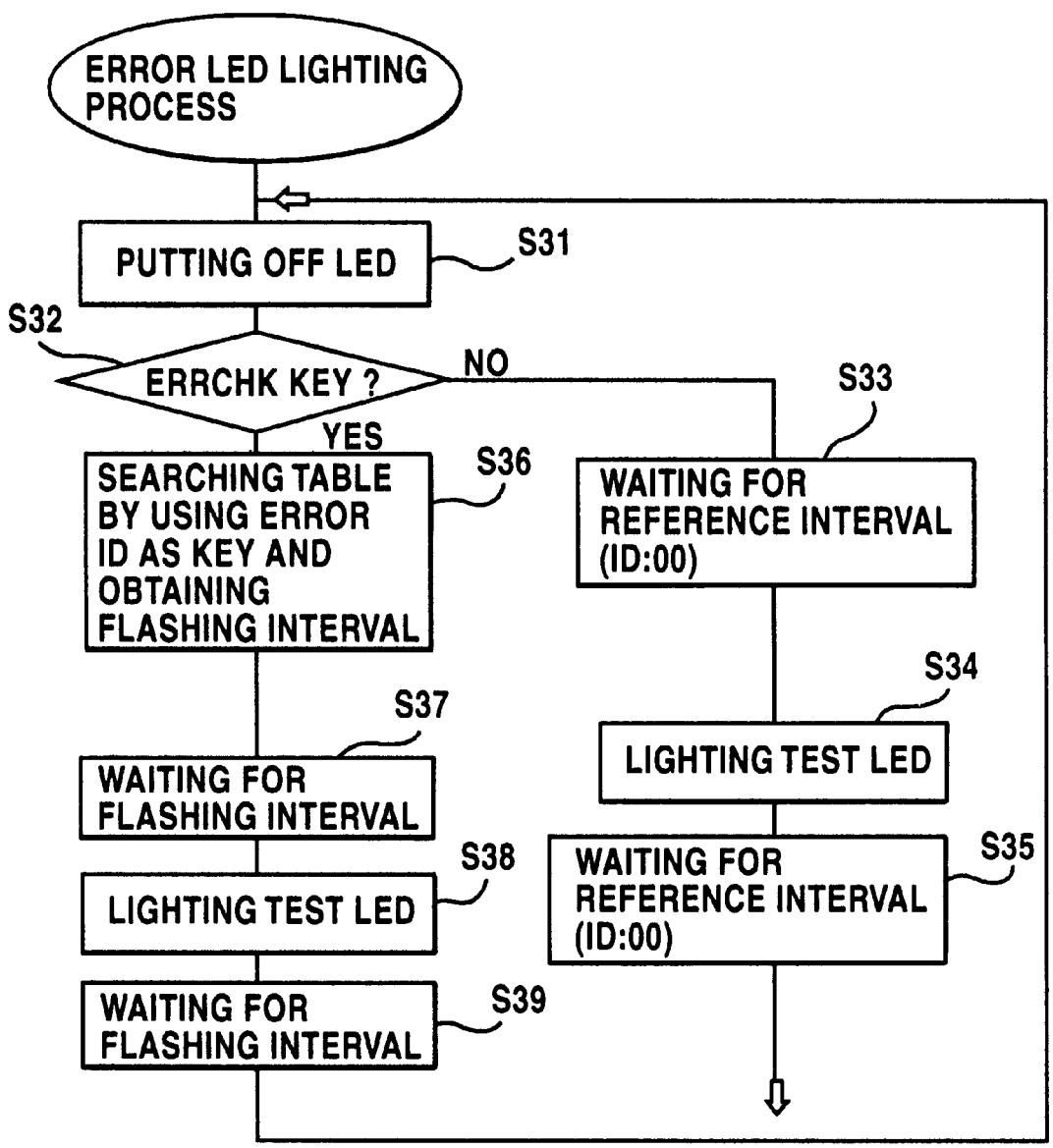
FIG. 8 is a flow chart illustrating an error LED lighting process of the second embodiment according to the present invention.

Next, an explanation is given of the error LED lighting process executed by the MPU 2 which reads the error LED lighting module 42 with reference to FIG. 8.

In the initial step S31 after starting, the MPU 2 puts off the test LED 501.

In the next step S32, the MPU 2 checks whether the error check key 511 is turned ON or not. When the error check key 511 is not turned ON (namely, in the first condition), the MPU 2 reads a flashing interval corresponding to an error ID (00) from the LED interval table in the step S33, and then waits for the read flashing interval (reference interval).

In the step S34 carried out after the reference interval, the MPU 2 lights the test LED 501.

In the next step S35, the MPU 2 waits for the reference interval. After the reference interval, the MPU 2 returns the process to the step S31 and puts off the test LED 501.

On the contrary, when it is determined that the error check key 511 is turned ON (namely, in the second condition) in the step S32, the MPU 2 reads a flashing interval corresponding to an error ID of the bit set to "1" in the parameter (initial error ID) from the LED flashing interval table in the step S36.

In the next step S37, the MPU 2 waits for the flashing interval read from the LED flashing interval table in the step S36.

In the step S38 executed after the flashing interval, the MPU 2 lights the test LED 501.

In the next step S39, the MPU 2 waits for the flashing interval read from the LED flashing interval table in the step S36. After the flashing interval, the MPU 2 returns the process to the step S31 and puts off the test LED 501.

Other modules of firmware in the second embodiment are similar to those in the first embodiment, therefore, explanations are omitted.

(Operation of Second Embodiment)

In the second embodiment, immediately after turning ON the power supply of the data modulator-demodulator A2, the MPU 2 carries out the initial check of each item by the initial error check module 41. While the initial error check is executed, the MPU 2 keeps lighting the error LED 501.

As the result of this initial error check, when it is detected that an operational error occurs, the MPU 2 keeps flashing the error LED 501 per the standard cycle read from the LED flashing interval table by the error LED lighting module 42 (S31, S33–S35).

When the user turns ON the error check key 511 while the error LED 501 flashes per the standard cycle, the MPU 2 flashes the error LED 501 in accordance with the bit set to "1" in the parameter (initial error ID) written in the RAM 3 per the flashing interval written in the LED flashing table as a correspondence to the error ID of that bit (S36–S39, S31).

According to the second embodiment, the operation of the first embodiment is carried out, further, the user can set a reference flashing interval and other flashing intervals in accordance with the user's feeling freely.

<Second Principle>

Figure 10:
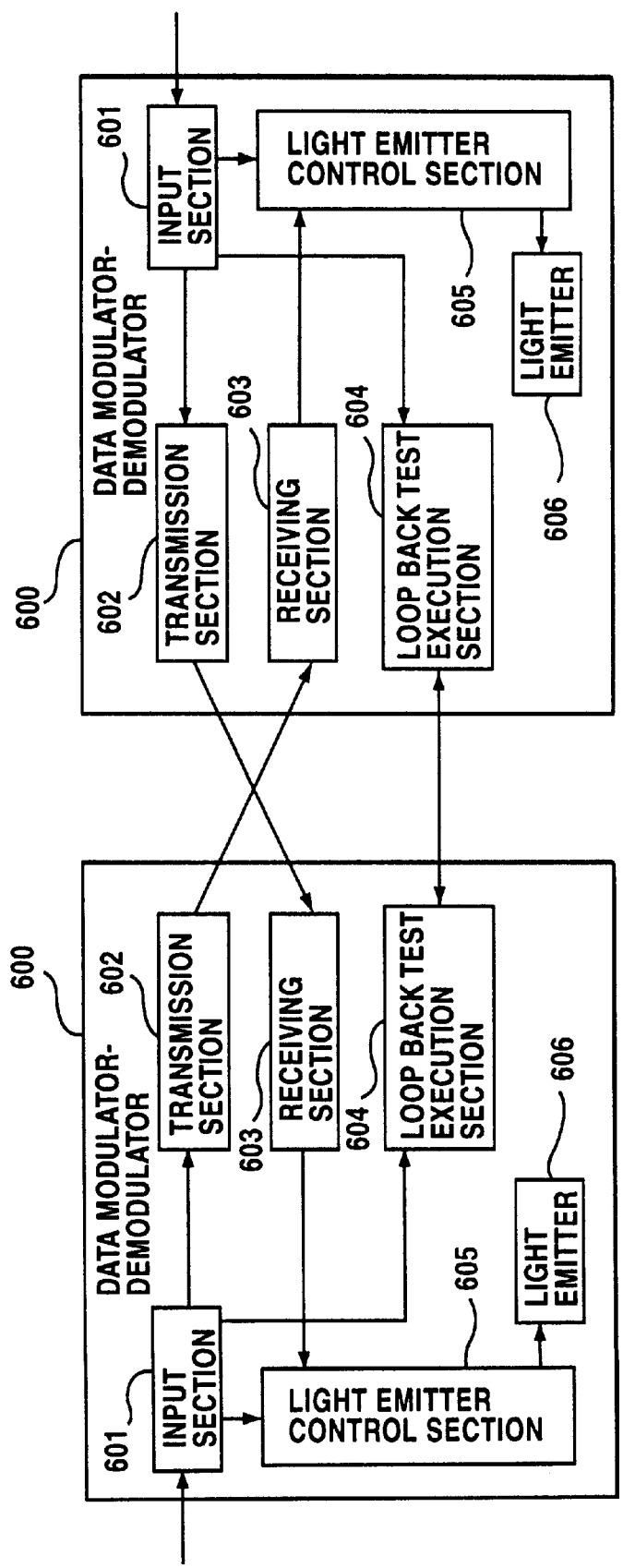
FIG. 10 is a view illustrating another principal of the present invention.

The second principle of the present invention, as shown in FIG. 10, is a data modulator-demodulator 600 executing a remote loop back test with another data modulator-demodulator 600. This data modulator-demodulator 600 comprises a light emitter 606, an input section 601 through which an instruction signal for executing the remote loop back test is inputted in accordance with an external operation, a transmission section 602 transmitting an instruction information for executing the remote loop back test to the other data modulator-demodulator when the instruction signal is inputted through the input section 601, a receiving section 603 receiving the instruction information transmitted from the transmission section 602 of the other data modulator-demodulator 600, a loop back test execution section 604 executing the remote loop back test with the other data modulator-demodulator 600 when the instruction signal is inputted through the input section 601 and when the receiving section 603 receives the instruction information, and a light emitter control section 605 lighting the light emitter when the instruction signal is inputted through the input section 601 and making the light emitter flash when the receiving section 603 receives the instruction information.

According to this structure, the instruction signal for executing the remote loop back test is inputted through the input section in accordance with the external operation. When the instruction signal is inputted through the input section 601 in this way, the transmission section 602 transmits the instruction information for executing the remote loop back test to the other data modulator-demodulator 600, the loop back test execution section 604 executes the remote loop back test with the other data modulator-demodulator 600, and the light emitter control section 605 lights the light emitter 606. The receiving section 603 receives the instruction information for executing the remote loop back test from the other data modulator-demodulator 600. When the receiving section 603 receives the instruction information, the loop back test execution section 604 executes the remote loop back test with the other data modulator-demodulator 600, and the light emitter control section 605 makes the light emitter 606 flash. Thus, the user can easily determine whether the loop back process between stations by the loop back process execution section 604 in the self-station is caused by the instruction signal inputted through the input section 601 in the self-station or caused by the instruction signal inputted through the input section 601 in the other station based on the lighting/flashing of the light emitter 606.

<Third Embodiment>

(Hardware Configuration of Data Modulator-Demodulator)

Figure 11:
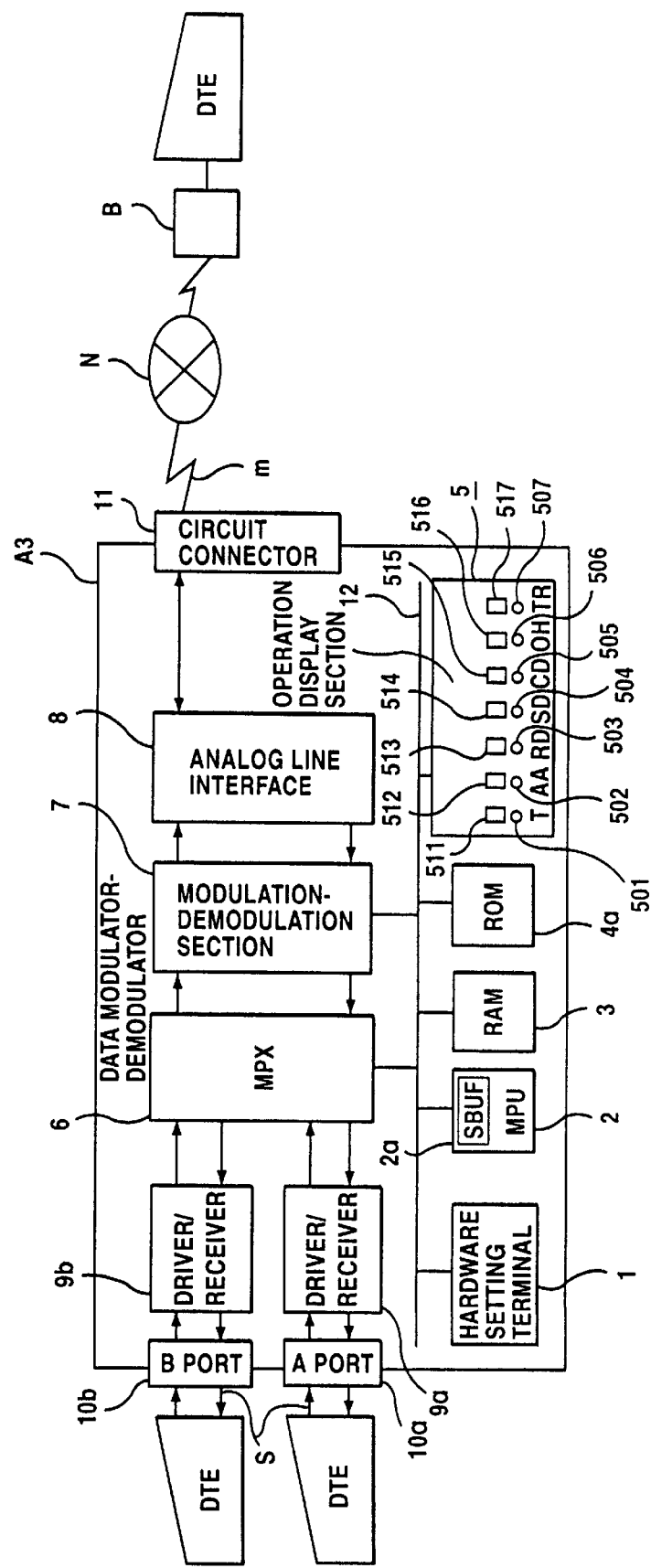
FIG. 11 is a block diagram illustrating a hardware configuration of a data modulator-demodulator of the third embodiment according to the present invention.

FIG. 11 is a block diagram illustrating a circuit structure of an data modulator-demodulator A3 of the third embodiment and connections with external devices. As shown in FIG. 11, the data modulator-demodulator A3 is connected to plural digital terminal equipments (DTE) via serial cables s and to an analog network N via a line m. The data modulator-demodulator (self-station) A3 converts the digital data outputted from each DTE into an analog signal, and then transmits the analog signal to other data modulator-demodulator (other station) B through the analog network N. The data modulator-demodulator (self-station) A3 also converts the analog signal received from the other data modulator-demodulator (other station) B through the analog network N into a digital signal, and then outputs the digital signal to an addressed DTE. Additionally, a structure of the data modulator-demodulator (self-station) A3 is similar to that of the other data modulator-demodulator (other station) B each other. Thus, explanations are given only of the data modulator-demodulator (self-station) A3.

The data modulator-demodulator (self-station) A3 of the third embodiment is different from that of the first embodiment in a respect that a serial buffer (SBUF) 2a is provided in the MPU 2.

Explanations will be given of points not shown in the first embodiment and different therefrom, and explanations are omitted of the same points as the first embodiment.

Ports (A port 10a, B port 10b) are connectors to which serial cables s linking to the DTEs are respectively connected. Additionally, the end of the serial cable s is connected to a checker instead of the DTE while the loop back test is executed. This checker is a test device which transmits a predetermined test pattern to the data modulator-demodulator (self-station) A3 and receives the test pattern returning through a loop formed in the data modulator-demodulator (self-station) A3 or the data modulator-demodulator (other station) B, and then compares the test pattern to be transmitted and the received test pattern and determines, when both of them are different, that a fault occurs in a data transmission path between the port (A port 10a, B port 10b) and the loop.

The MPX 6 respectively controls the driver/receivers 9a, 9b. The MPX 6 also converts the serial digital signal (including the test pattern) received from the driver/receivers 9a, 9b to be a speed corresponding to the communication speed set by the MPU 2 and transmits the signal to the modulation-demodulation section 7, and transmits the serial digital signal (including the test pattern) received from the modulation-demodulation section 7 to the corresponding driver/receivers 9a, 9b. The MPX 6 notifies the MPU 2 of a command (including a test command and a test end command) received via the modulation-demodulation section 7 and issued by the other data modulator-demodulator B to the MPU 2 via the bus 12. The MPX 6 transmits another command received from the MPU 2 and addressed to the data modulator-demodulator B (test command or test end command) to the modulation-demodulation section 7. The MPX 6 issues the test pattern instead of the DTE in accordance with a self-test command, described later, from the MPU 2, transmits the test pattern to the modulation-demodulation section 7 and receives the test pattern returned from the modulation-demodulation section 7 and issued by itself. Then, the MPX 6 determines whether the test pattern for transmitting coincides with the received test pattern or not and notifies the MPU 2 of the determined result.

The LED 501 functions as a light emitter indicating an execution state of the loop back test. The LED 501 lights, whereby indicates that the loop back test is executed by a trigger from the self-station. The LED 501 flashes, whereby indicates that the loop back test is executed by a trigger from the other station (hereinafter, the LED 501 is called "test LED"). The other LEDs 502–507 indicate the same data as the first embodiment.

Now, the switches 511–517 input following triggers to the MPU 2.

Figure 16:
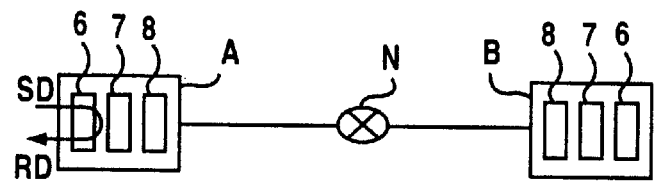
FIG. 16 is an explanatory view of a local digital loop back test.

That is, when the test switch 512 is operated by the user, a trigger executing a local digital loop back test (instruction signal for local loop back test execution) is inputted to the MPU 2. The local digital loop back test, as shown in FIG. 16, is a test in which a loop is formed between the MPX 6 and the modulation-demodulation section 7 in the data modulator-demodulator (self-station) A3 and a test pattern inputted from the checker is turned back to the checker by the loop.

Figure 17:
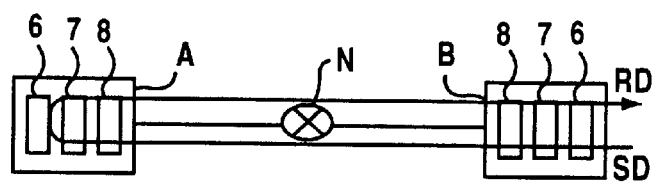
FIG. 17 is an explanatory view of an analog loop back test.

When the test switch 513 is operated by the user, a trigger executing an analog loop back test (instruction signal for remote loop back test execution) is inputted to the MPU 2. The analog loop back test, as shown in FIG. 17, is a test in which a test command (instruction information for remote loop back test execution) is transmitted to the other data modulator-demodulator (other station) B, a loop is formed between the MPX 6 and the modulation-demodulation section 7 in the data modulator-demodulator (self-station) A3 and a test pattern transmitted from the other data modulator-demodulator (other station) B is turned back to the other data modulator-demodulator (other station) B by this loop.

Figure 18:
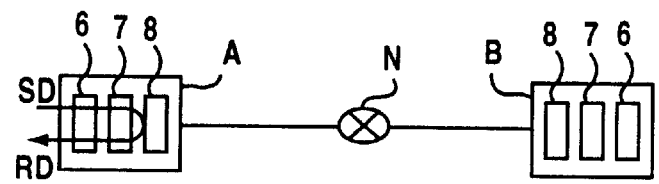
FIG. 18 is an explanatory view of a local analog loop back test.

When the test switch 514 is operated by the user, a trigger executing a local analog loop back test (instruction information for local loop back test execution) is inputted to the MPU 2. The local analog loop back test, as shown in FIG. 18, is a test in which a loop is formed between the modulation-demodulation section 7 and the analog interface 8 in the data modulator-demodulator (self-station) A3 and a test pattern inputted from the checker is turned back to the checker by this loop.

Figure 19:
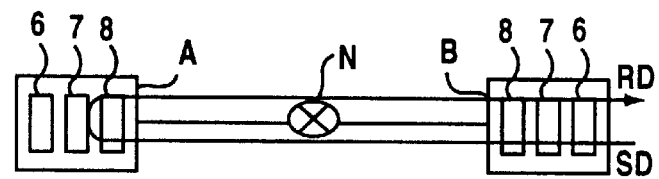
FIG. 19 is an explanatory view of a digital loop back test.

When the test switch 515 is operated by the user, a trigger executing a digital loop back test (instruction signal for remote loop back test execution) is inputted to the MPU 2. The digital loop back test, as shown in FIG. 19, is a test in which a test command (instruction information for remote loop back test execution) is transmitted to the other data modulator-demodulator (other station) B, a loop is formed between the modulation-demodulation section 7 and the analog line interface 8 in the data modulator-demodulator (self-station) A3 and a test pattern transmitted from the other data modulator-demodulator (other station) B is turned back to the other data modulator-demodulator (other station) B by this loop.

Figure 20:
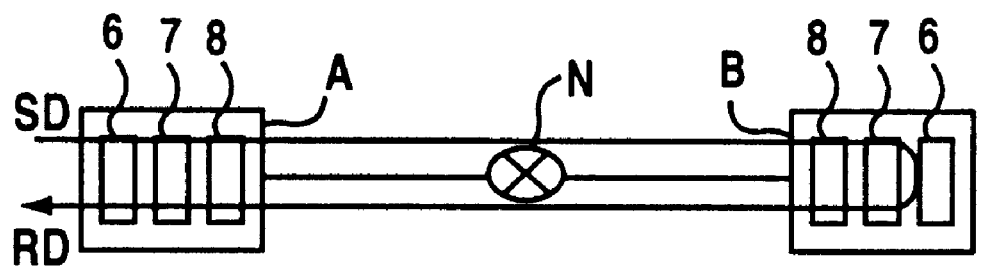
FIG. 20 is an explanatory view of a remote digital loop back test.

When the test switch 516 is operated by the user, a trigger executing a remote digital loop back test (instruction signal for remote loop back test execution) is inputted to the MPU 2. The remote digital loop back test, as shown in FIG. 20, is a test in which a test command (instruction information for remote loop back test execution) is transmitted to the other data modulator-demodulator (other station) B, a test pattern transmitted from the DTE connected to the data modulator-demodulator (self-station) A3 is transmitted to the other data modulator-demodulator (other station) B and the test pattern turning back from the other data modulator-demodulator (other station) B is introduced to the DTE.

Figure 21:
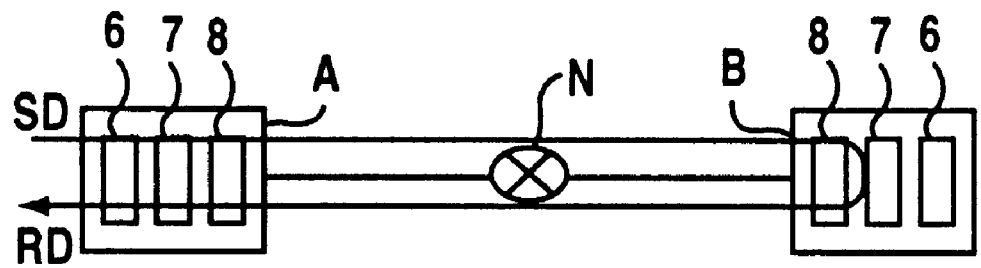
FIG. 21 is an explanatory view of a remote analog loop back test.

When the test switch 517 is operated by the user, a trigger executing a remote analog loop back test (instruction signal for remote loop back test execution) is inputted to the MPU 2. The remote analog loop back test, as shown in FIG. 21, is a test in which a test command (instruction information for remote loop back test execution) is transmitted to the other data modulator-demodulator (other station) B, a test pattern transmitted from the DTE connected to the data modulator-demodulator (self-station) A3 is transmitted to the other data modulator-demodulator (other station) B and the test pattern turning back from the other data modulator-demodulator (other station) B is introduced to the DTE.

The above test switches 512–517 correspond to an input section inputting an instruction signal for remote loop back test execution and an instruction signal for local loop back test execution in accordance with external operations. Particularly, the test switches 513, 515–517 correspond to an input section inputting an instruction signal for remote loop back test execution in accordance with external operations.

The check switch 511 is operated by the user while the above-described various loop back tests are executed, and then a trigger changing a loop back test being executed for a self-test is inputted to the MPU 2. The MPU 2 to which this trigger is inputted instructs the above-mentioned self-test to the MPX 6.

The MPU 2 is provided with a serial buffer (SBUF) 2a. The serial buffer (SBUF) 2a is used for command notification to the MPU 2 and command transmission from the MPU 2. When a command is notified to the MPU 2, the command is written in the serial buffer (SBUF) 2a of the MPU 2. When a command is transmitted from the MPU 2, the command is written in the serial buffer (SBUF) 2a of the MPU 2.

(Structure of Firmware)

Figure 12:
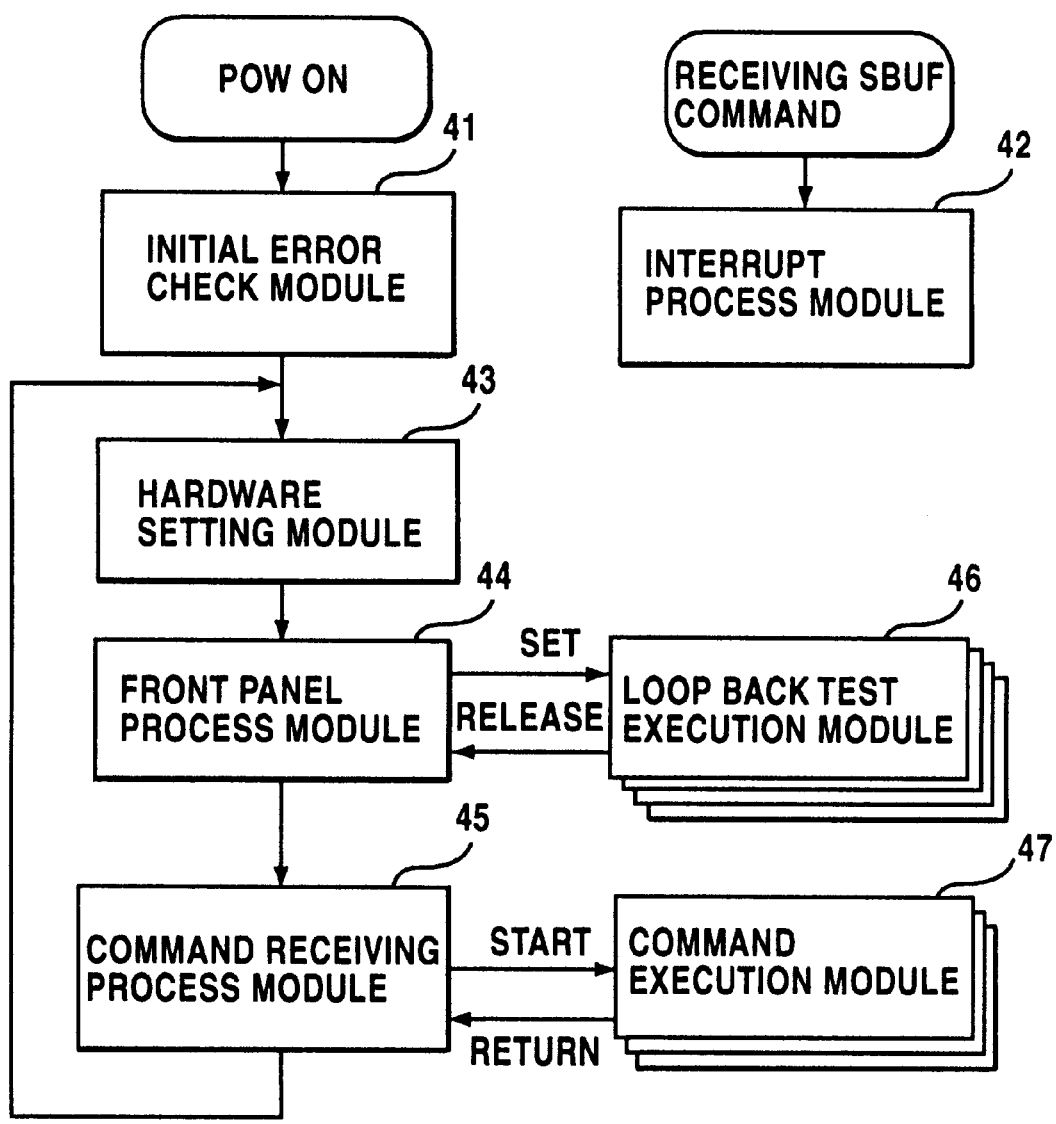
FIG. 12 is a structural view of a firmware stored in the ROM 4a in FIG. 11.

Next, an explanation is given of an outline structure of the firmware stored in the ROM 4. As shown in FIG. 12, the firmware stored in the ROM 4 is provided with plural modules (an initial error check module 41, a hardware setting module 43, an front panel process module 44, a command receiving process module 45, various loop back test execution modules 46, command execution modules 47 and an interrupt process module 42).

The interrupt process module 42 as a receiving section starts whenever a command (a test command and a test end command) is written in the serial buffer (SBUF) 2a of the MPU 2 by the MPX 6, and copies the command written in the serial buffer (SBUF) 2a to the RAM 3.

On the other hand, the initial error check module 41 starts by supplying the main power of the data modulator-demodulator A3, and checks each section in the data modulator-demodulator A3. Then, the initial error check module 41, only when no operational error occurs, advances the process to the hardware setting module 43.

The hardware setting module monitors the setting condition of the hardware setting terminal 1, and instructs the MPX 6 and the modulation-demodulation section 7 so that the operation state is varied in accordance with that setting condition. The hardware setting module 43, when the necessary instructions are completed, advances the process to the front panel process module 44.

The front panel process module 44 as a light emitting control section monitors operational states of the respective test switches 512–517, and, when any test switch 512–517 is switched ON, lights the test LED 501 and sets the test state by calling the loop back test execution module 46 corresponding to the test switch 512–517 which is switched ON. The front panel process module 44, when the test switch 512–517 which has been turned ON is switched OFF, releases the loop back test execution module 46 corresponding to the test switch 512–517 which is switched OFF. At the same time, the front panel process module 44, when a loop back test except for the local digital loop back test and the local analog loop back test is executed, transmits a test end command to the other data modulator-demodulator (other station) B. Then, after the test LED 501 is put off, the process is advanced to the command receiving process module 45.

The loop back test execution module 46 as a transmission section and a loop back test execution section is provided with the following six modules.

A first module as a local loop back test execution section, when the test switch 512 is switched ON (triggered), is called, and forms a loop between the MPX 6 and the modulation-demodulation section 7 in the self-station.

A second module as a remote loop back test execution section, when the test switch 513 is switched ON (triggered), is called, and then transmits a test command of the analog loop back test to the other data modulator-demodulator (other station) B and forms a loop between the MPX 6 and the modulation-demodulation section 7 in the self-station.

A third module as a local station loop back test execution section, when the test switch 514 is switched ON (triggered), is called, and forms a loop between the modulation-demodulation section 7 and the analog line interface 8 in the self-station.

A fourth module as a remote loop back test execution section, when the test switch 515 is switched ON (triggered), is called, and then transmits a test command of the digital loop back test to the other data modulator-demodulator (other station) B and forms a loop between the modulation-demodulation section 7 and the analog interface line 8 in the self-station.

A fifth module as a remote loop back test execution section, when the test switch 516 is switched ON (triggered), is called and transmits a test command of the remote digital loop back test to the other data modulator-demodulator (other station) B.

A sixth module as a remote loop back test execution section, when the test switch 517 is switched on (triggered), is called and transmits a test command of the remote analog loop back test to the other data modulator-demodulator (other station) B.

Additionally, the first module, the third module, the fifth module and the sixth module in the loop back test execution module 46, when the check switch 511 is switched on (triggered), gives a self-test command to the MPX 6.

The command receiving process module 45 as a light emitting control section monitors whether the command written by the interrupt process module 42 is in the RAM 3 or not. When there is a test command issued by the other station in the RAM 3, the command execution module 47 corresponding to the test command is called. At the same time, the command receiving process module 45 flashes the test LED 501. The command receiving process module 45, when there is a test end command issued by the other station (a command terminating the loop back test) in the RAM 3, releases the command execution module 47 corresponding to this test end command and puts off the test LED 501, and then advances the process to the hardware setting module 43.

The command execution module 47 as the loop back test execution section comprises the following four modules.

The first module as the remote loop back test execution section called, when a test command of the analog loop back test is received from the other station.

The second module as the remote loop back test execution section is called, when a test command of the digital loop back test is received from the other station.

The third module as the remote loop back test execution section is called and forms a loop between the modulation-demodulation section 7 and the MPX 6, when a test command of the remote digital loop back test is received from the other station.

The fourth module as the remote loop back test execution section is called and forms a loop between the analog line interface 8 and the modulation-demodulation section 7 in the self-station, when a test command of the remote analog loop back test is received from the other station.

Further, the first module and the second module of the command execution module 47 send a self-test command to the MPX 6, when the check switch 511 of the operation display section 5 in the self-station is ON (triggered).

(Processes of Front Panel Process Module and Loop Back Test Execution Module)

Figure 13:
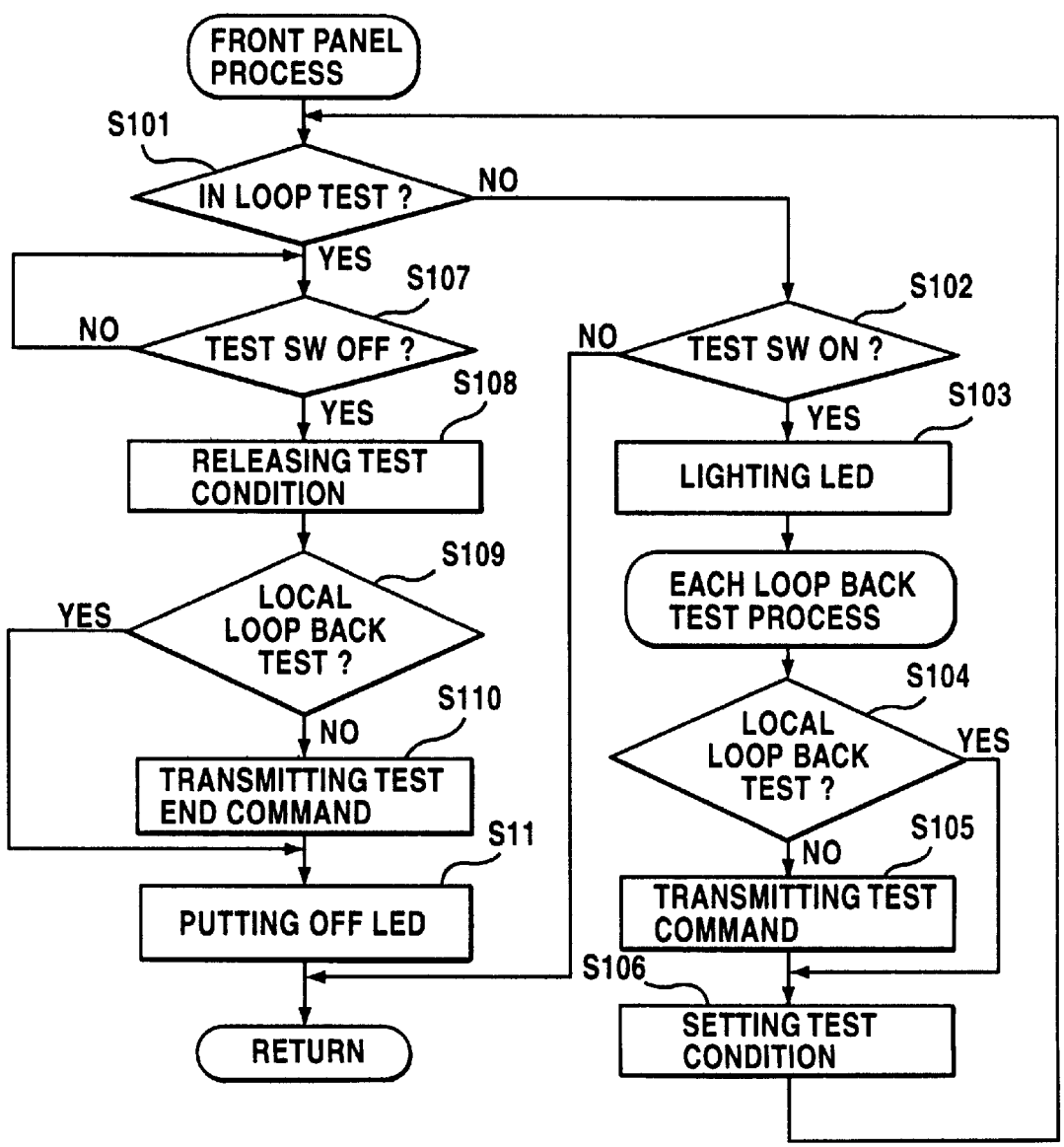
FIG. 13 is a flow chart illustrating a front panel process executed by the MPU 2 which reads the front panel process module and each loop back test process executed by the MPU 2 which reads each loop back test execution process module in FIG. 12.

Next, an explanation is given of the front panel process executed by the MPU 2 which reads the front panel process module 44 with reference to FIG. 13.

In the initial step S101 after starting, the MPU 2 checks which loop back test is executed (namely, which loop back test execution module 46 starts). When no loop back test is executed, the MPU 2 advances the process to the step S102.

In the step S102, the MPU 2 checks which test switch 512–517 is ON. When none of the test switches 512–517 is ON, the MPU 2 terminates the front panel process and turns the process to the command receiving process module 45.

On the contrary, when one of the test switches 512–517 is ON, in the step S103, the MPU 2 lights the test LED 501 (corresponding to the light emitter control section).

The process between the steps S104 and S106 is a loop back test process by the loop back test execution module 46 corresponding to the switch 512–517 which is ON.

In the step S104, the MPU 2 checks whether one of the local digital loop back test and the local analog loop back test is executed or not (namely, whether one of the test switches 512 and 514 is ON or not). When the local digital loop back test or the local analog is executed (namely, when the test switch 512 or 514 is ON), the MPU 2 directly advances the process to the step S106. On the contrary, when a loop back test except for the local digital loop back test and the local analog loop back test is executed (namely, when one of the switches 513, 515–517 is ON), the MPU 2 sends a test command instructing to start a loop back test corresponding to one of the switches 513, 515–517 in tuning ON to the other data modulator-demodulator (other station) B (corresponding to the transmission section). Then, the MPU 2 advances the process to the step S106.

In the step 106, the MPU 2 activates the loop back test execution module 47 and shifts the data modulator-demodulator A3 to an execution state of the loop back test corresponding to the test switch 512–517 which is ON. In other words, when the test switch 512 is turned ON, a loop is formed between the MPX 6 and the modulation-demodulation section 7. When the test switch 513 is turned ON, a loop is formed between the MPX 6 and the modulation-demodulation section 7. When the test switch 514 is turned ON, a loop is formed between the modulation-demodulation section 7 and the analog line interface 8. When the test switch 515 is turned ON, a loop is formed between the modulation-demodulation section 7 and the analog line interface 8. Additionally, when one of the switches 512, 514, 516 and 517 and the check switch 511 are ON, a self-test command is sent to the MPX 6. Then, the MPU 2 returns to the front panel process (S101).

On the contrary, when it is determined that one of loop back tests is executed in the step S101, the MPU 2 waits that the switch 512–517 corresponding to the loop back test being executed is turned OFF.

When the switch 512–517 corresponding to the loop back test being executed is turned OFF, the MPU 2 disables the loop back test execution module 46 in operating and shifts the data modulator-demodulator A3 to an unexcution state of the loop back test.

In the next step S109, the MPU 2 checks whether the loop back test of which the state has been shift in the step S108 is one of the local digital loop back test and the local analog loop back test. When the local digital loop back test or the local analog loop back test is executed, the MPU 2 advances the process to the step S111 directly. When a loop back test expect for the local digital loop back test and the local analog loop back test is executed, the MPU 2 sends a test end command to the other data modulator-demodulator (other station) B in the step S110, and then advances the process to the step S111.

In the step S111, the MPU 2 puts the test LED 501 off. Thereafter, the MPU 2 terminates the front panel process and advances the process to the command receiving module.

(Process by Interrupt Process Module)

Figure 14:
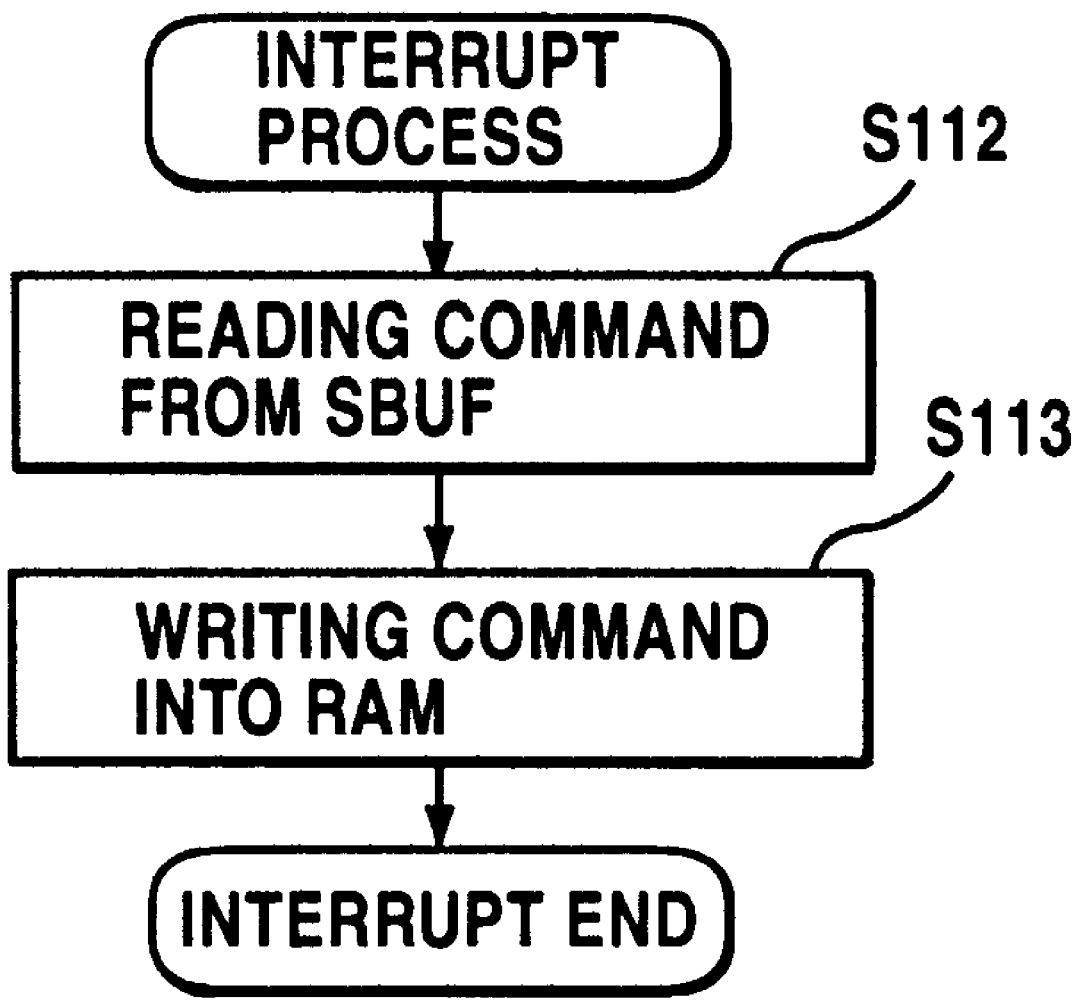
FIG. 14 is a flow chart illustrating a interrupt process executed by the MPU 2 which reads the interrupt process module in FIG. 12.

Next, an explanation is given of an interrupt process executed by the MPU 2 which has read the interrupt process module 42 with reference to FIG. 14. The interrupt process, as above described, starts by interrupt, when a command (test command or test end command) is written in the serial buffer (SBUF) 2a in the MPU 2.

In the initial step S112 after starting, the MPU 2 reads the command (test command or test end command) written in the serial buffer (SBUF) 2a (corresponding to the transmission section).

In the next step S113, the MPU 2 writes the command (test command or test end command) which has read in the step S112 into the RAM 3. Thereafter, the MPU 2 terminates this interrupt process, and restarts the process which has been executed before interrupt.

(Process by Command Receiving Process Module)

Figure 15:
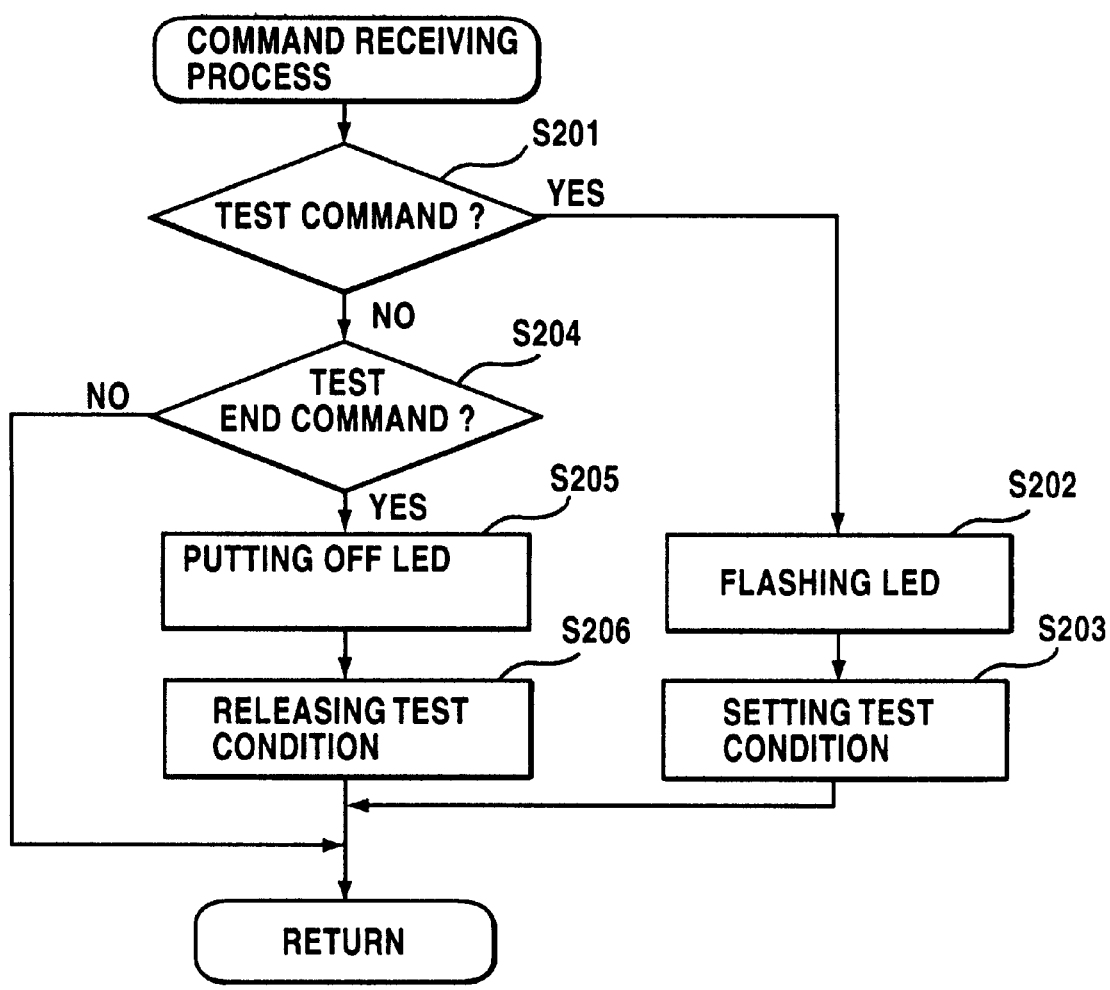
FIG. 15 is a flow chart illustrating a command receiving process executed by the MPU 2 which reads the command receiving process module in FIG. 12.

Next, an explanation is given of a command receiving process executed by the MPU 2 which has read the command receiving process module 45 with reference to FIG. 15.

In the initial step S201 after starting, the MPU 2 checks whether any test command is written in the RAM 3 or not. When any test command is written, the MPU 2 flashes the test LED 501 in the step S202 (corresponding to the light emitter control section). In the next step S203, the MPU 202 calls the command execution module 47 corresponding to the test command written in the RAM 3 and shifts the data modulator-demodulator A3 to an execution state of the corresponding loop back test. Then, the MPU 2 terminates this command receiving process and advances the process to the hardware setting module.

On the contrary, when it is determined that no test command is written in the RAM 3 in the step S201, the MPU 2 checks whether the test end command is written in the RAM 3 or not. When the test command is written, the MPU 2 puts the test LED 501 off in the step S205. In the next step S206, the MPU 2 disables the test command execution module 47 in operating and shifts the data modulator-demodulator to an unexcution state of the loop back test. Then, the MPU 2 terminates this command receiving process and turns the process to the hardware setting module.

When it is determined that no test end command is written in the RAM 3 in the step 204, the MPU 2 terminates the command receiving process and turns the process to the hardware setting module.

(Operation of Third Embodiment)

According to the third embodiment, when any test switch 512–517 of the data modulator-demodulator A3 is turned ON, the MPU 2 in the data modulator-demodulator A3 turns on the test LED 501 regardless of the kind of the loop back test (S103).

When any of test switches 513, 515–517 is ON, the MPU 2 in the data modulator-demodulator A3 sends a test command to the other data modulator-demodulator B (S105).

Next, the MPU 2 in the data modulator-demodulator A3 is shifted to an execution state of the loop back test corresponding to the switch 512–517 which is turned ON (S106).

On the contrary, the MPU 2 in the data modulator-demodulator A3, when receives the test command, flashes the test LED 501 (S202), and shifts the data modulator-demodulator A3 to an execution state of the loop back test corresponding to the received test command (S203).

Thereafter, when the test switch 512–517 of the data modulator-demodulator A3 is turned OFF, the MPU 2 shifts the data modulator-demodulator A3 to the unexcution state of the loop back test (S108).

When the executed loop back test is not the local analog loop back test or the local digital loop back test, the MPU 2 in the data modulator-demodulator A3 sends a test end command to the other data modulator-demodulator B (S110).

Then, the MPU 2 in the data modulator-demodulator B puts the test LED 501 off (S111).

In this way, when the loop back test is executed by the trigger in the self-station, the test LED 501 lights regardless of the kind of the loop back test. Thus, it is possible easily for the user to know that the loop back test is executed by the trigger in the self station. On the other hand, when the loop back test is executed by the trigger from the other station, the test LED 501 flashes. Thus, it is possible easily for the user to know that the loop back test is executed by the trigger from the other station.

<Fourth Embodiment>

The fourth embodiment of the present invention, compared with the above third embodiment, is characterized in that an user can freely set a flashing cycle of the test LED 501 indicating that the remote loop back test is executed by the trigger from the other station in accordance with the user's feeling.

(Hardware Configuration of Data Modulator-Demodulator)

Figure 22:
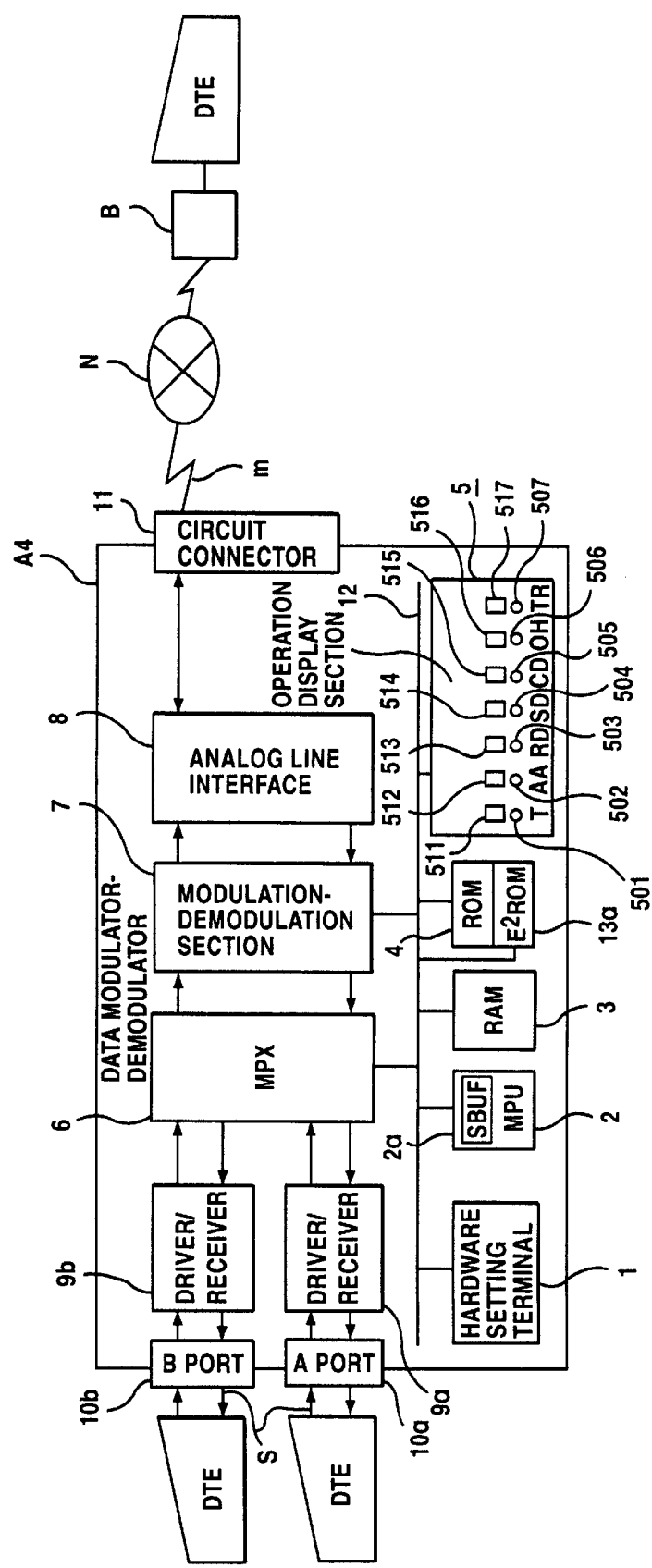
FIG. 22 is a block diagram illustrating a hardware configuration of a data modulator-demodulator of the fourth embodiment according to the present invention.

FIG. 22 is a block diagram showing a circuit structure and a connection condition with external equipment in a data modulator-demodulator A4 according to the fourth embodiment. As shown in FIG. 22, the data modulator-demodulator A4 of the fourth embodiment is similar to the third embodiment except that an $E^2ROM$ 13 is connected to the bus 12.

FIG. 24 shows a structure of an LED flashing interval table (memory area) made by the user and written in the $E^2ROM$ 13. As shown in FIG. 24, the LED flashing interval table in which flashing cycles are respectively corresponded to an ID "00" indicating the trigger in the self-station and an ID "01" indicating the trigger from the other station. In this table, "0 (continuously lighting)" is set as the flashing interval corresponding to the ID "01" so that the interval can not be rewritten, and a desired flashing interval (flashing cycle) is written as the flashing interval corresponding to the ID "01" by the user. Flashing intervals (flashing cycles) are written and updated into the LED flashing interval table based on the command from the DTE by the MPU 2.

Other structures in the fourth embodiment are similar to those in the third embodiment, therefore, explanations thereof are omitted.

(Processes by Front Panel Process Module and Loop Back Test Execution Module)

Figure 23:
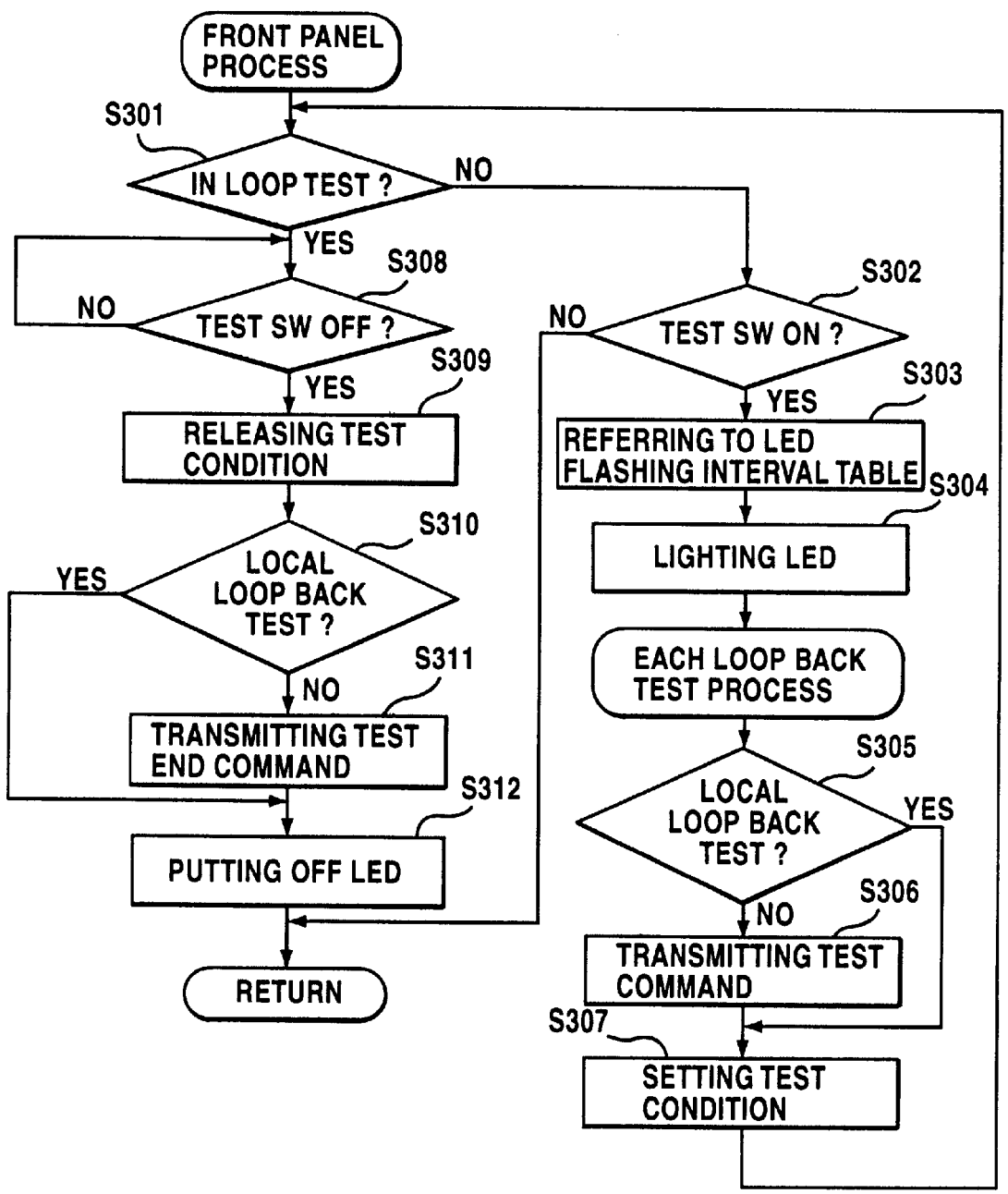
FIG. 23 is a flow chart illustrating a front panel process and each loop back test process in the fourth embodiment according to the present invention.

Next, an explanation is given of the front panel process executed by the MPU 2 which reads the front panel process module 44 with reference to FIG. 23.

In the initial step S301 after starting, the MPU 2 checks whether any loop back test is being executed at present time (namely, whether any loop back test execution module 46 starts or not). When no loop back test is executed, the MPU 2 advances the process to the step S302.

In the step S302, the MPU 2 checks whether any test switch 512–517 is turned ON or not. When no test switch 512–517 is turned ON, the MPU 2 terminates this front panel process and turns the process to the command receiving process module 45.

On the contrary, when one of the test switches 512–517 is turned ON, the MPU 2 reads the flashing interval "0" corresponding to the ID "00" from the LED flashing interval table in the step S303.

In the next step S304, the MPU 2 lights the test LED 501 in accordance with the flashing interval "0" read in the step S303 (corresponding to the light emitter control section).

The following process between the steps S305 and S307 is the loop back test process by the loop back test execution module 46 corresponding to the switch 512–517 which is turned ON.

In the step S305, the MPU 2 checks whether the local digital loop back test or the local analog loop back test is executed or not (namely, whether the test switch 512 or 514 is turned ON or not). When the local digital loop back test or the local analog loop back test is executed (namely, when the test switch 512 or 514 is turned ON), the MPU 2 advances the process to the step S307. On the contrary, when a loop back test expect for the local digital loop back test and the local analog loop back test is executed (namely, when one of the test switches 513, 515–517 is turned ON), the MPU 2 sends a test command instructing to start the loop back test corresponding to the test switch 513, 515–517 which is turned ON to the other data modulator-demodulator (other station) B (corresponding to a transmission section). Then, the MPU 2 advances the process to the step S307.

In the step S307, the MPU 2 shifts the data modulator-demodulator A4 to the execution state of the loop back test corresponding to the test switch 512–517 which is turned ON. That is, when the test switch 512 is turned ON, a loop is formed between the MPX 6 and the modulation-demodulation section 7. When the test switch 513 is turned ON, a loop is formed between the MPX 6 and the modulation-demodulation section 7. When the test switch 514 is turned ON, a loop is formed between the modulation-demodulation section 7 and the analog line interface 8. When the test switch 515 is turned ON, a loop is formed between the modulation-demodulation section 7 and the analog line interface 8. Additionally, the test switch 512, 514, 516 or 517 and the check switch 511 are turned ON, a self-test command is sent to the MPX 6. Thereafter, the MPU 6 returns to the front panel process (S301).

On the contrary, when it is determined that any loop back test is being executed in the step S301, the MPU 2 waits that the test switch 512–517 corresponding to the loop back test being executed is turned OFF.

When the test switch 512–517 corresponding to the loop back test being executed is turned OFF, the MPU 2 disables the loop back test execution module 46 and shifts the data modulator-demodulator A4 to the unexcution state of the loop back test.

In the next step S310, the MPU 2 checks whether the loop back test of which the state is shifted in the step S309 is the local digital loop back test or the local analog loop back test. When the local digital loop back test or the local analog loop back test is executed, the MPU 2 advances the process to the step S312 directly. On the contrary, when a loop back test expect for the local digital loop back test and the local analog loop back test is executed, the MPU 2 sends a test end command to the other data modulator-demodulator (other station) B in the step S311, and then advances the process to the step S312.

In the step S312, the MPU 2 puts the test LED 501 off. Then, the MPU 2 terminates this front panel process, and then turns the process to the command receiving process module.

(Process by Command Receiving Process Module)

Figure 25:
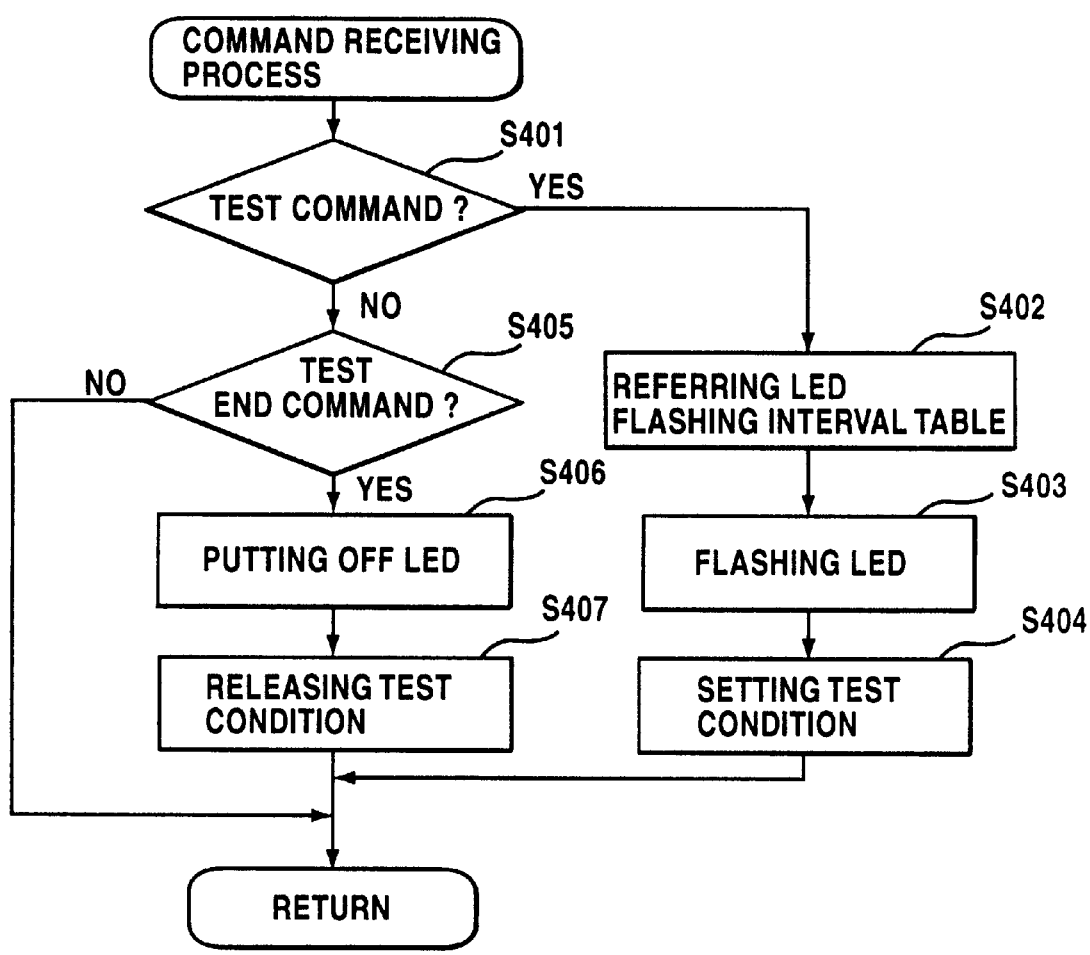
FIG. 25 is a flow chart illustrating a command receiving process in the fourth embodiment according to the present invention.

Next, an explanation is given of the command receiving process executed by the MPU 2 which reads the command receiving process module 45 with reference to FIG. 25.

In the initial step S401 after starting, the MPU 2 checks whether any test command is written in the RAM 3 or not. When any test command is written in the RAM 3, the MPU 2 reads the flashing interval corresponding to the ID "01" from the LED interval table in the step S402.

In the next step S403, the MPU 2 flashes the test LED 501 in accordance with the flashing interval read in the step S402 (corresponding to the light emitter control section).

In the next step S404, the MPU 2 calls the test command execution module 47 corresponding to the test command written in the RAM 3, and then shifts the data modulator-demodulator A4 to the execution state of the corresponding loop back test. Thereafter, the MPU 2 terminates this command receiving process, and then turns the process to the hardware setting module.

On the contrary, when it is determined that no test command is written in the RAM 3 in the step S401, the MPU 2 checks whether a test end command is written in the RAM 3 or not. When the test end command is written in the RAM 3, the MPU 2 puts the test LED 501 off in the step S406. In the next step S407, the MPU 2 disables the command execution module 47 in operation and shifts the data modulator-demodulator A4 to the unexcution state of the loop back test. Then, the MPU 2 terminates this command receiving process and turns the process to the hardware setting module.

On the contrary, when it is determined that no test end command is written in the RAM 3 in the step S405, the MPU 2 terminates the command receiving process immediately and turns the process to the hardware setting module.

In the fourth embodiment, modules of other firmware are similar to those of the third embodiment, therefore, explanations thereof are omitted.

(Operation in Fourth Embodiment)

According to the fourth embodiment, when any test switch 512–517 in the data modulator-demodulator A is turned ON, the MPU 2 in the data modulator-demodulator A reads the flashing interval "0" corresponding to the ID "00" from the LED flashing interval table (S303) and lights the test LED 501 (S204).

When the switch turned ON is one of the test switches 513, 515–517, the MPU 2 in the data modulator-demodulator A sends a test command to the other data modulator-demodulator B (S306).

Then, the MPU 2 shifts the data modulator-demodulator A to the execution state of the loop back test corresponding to the test switch 512–517 turned ON (S307).

On the contrary, the MPU 2 in the other data modulator-demodulator B, when receives the test command, reads the flashing interval corresponding to the ID "01" from the LED flashing interval table (S402), flashes the test LED 501 (S403) and shifts the other data modulator-demodulator B to the execution state of the loop back test corresponding to the received test command (S404).

According to the fourth embodiment, in addition to the operations of the above described third embodiment, it becomes possible for the user to set freely flashing intervals of the test LED 501 indicating that the loop back test is executed based on the trigger from the other station in accordance with feeling of the user.

According to the error indicator of the present invention structured as above described, it is possible to flash a light emitter in a manner that the user can distinguish flashing cycles without a special reference tool. Thus, one light emitter can indicate occurrences of plural operation errors so as to distinguish them.

Moreover, according to the data modulator-demodulator and the display method of the light emitter in the data modulator-demodulator, one light emitter can indicate whether a remote loop back test is based on a trigger from the self data modulator-demodulator or from the other data modulator-demodulator.

This invention being thus described, it will be obvious that same may be varied in various ways. Such variations are not to be regarded as departure from the spirit and scope of the invention, and all such modifications would be obvious for one skilled in the art intended to be included within the scope of the following claims.

What is claimed is:

1. An error indicator indicating an operational error of information equipment, comprising:

a light emitter arranged on the information equipment;

an operational state monitoring device monitoring an operational state of each section in the information equipment and detecting whether or not the operational error occurs and a kind of the operational error;

an operating member in one of a first condition and a second condition; and a flashing control section starting when the operational error is detected by said operational state monitoring device, and flashing said light emitter at a predetermined standard cycle if said operating member is in the first condition, or flashing at a cycle corresponding previously to the kind of the operational error detected by said operational state monitoring device if said operating member is in the second condition.

2. An error indicator according to the claim 1, wherein said operating member is normally in the first condition and, only when said operating member is operated, becomes in the second condition.

3. An error indicator according to the claim 1, further comprising a table in which each kind of the operational error corresponding to any flashing cycle; and wherein said flashing control section, when said operating member is in the second condition, reads the flashing cycle corresponded to the kind of the operational error detected by said operational state monitoring device from said table.

4. An error indicator according to the claim 1, wherein the cycle corresponding to the kind of the operational error includes a cycle shorter than said standard cycle or another cycle longer than said standard cycle.

5. A data modulator-demodulator executing a remote loop back test with another data modulator-demodulator, comprising:

a light emitter;

an input section through which an instruction signal for executing the remote loop back is inputted when operated;

a transmission section transmitting an instruction information for executing the remote loop back test to the other data modulator-demodulator when said instruction signal is inputted through said input section;

a receiving section receiving the instruction information transmitted from the transmission section of the other data modulator-demodulator;

a loop back test execution section executing the remote loop back test with the other data modulator-demodulator when the instruction signal is inputted through said input section and when said receiving section receives the instruction information; and a light emitter control section lighting the light emitter when the instruction signal is inputted through the input section and making the light emitter flash when the receiving section receives the instruction information, wherein said light emitter control section has a memory area in which a flashing cycle of the light emitter is written rewritably and flashes the light emitter in accordance with the flashing cycle written in the memory area when the receiving section receives the instruction information.

6. A data modulator-demodulator according to the claim 5, wherein said input section is a switch generating the instruction signal when operated.

7. A data modulator-demodulator executing a remote loop back test with another data modulator-demodulator and a local loop back test selectively, comprising:

a light emitter;

an input section through which an instruction signal for executing the remote loop back test and another instruction signal for executing the local loop back test are inputted when operated;

a transmission section transmitting an instruction information for executing the loop back test to the other data modulator-demodulator when said instruction signal for executing the remote loop back test is inputted through said input section;

a receiving section receiving the instruction information transmitted from the transmission section of the other data modulator-demodulator;

a remote loop back test execution section executing the remote loop back test with the other data modulator-demodulator when the instruction signal for executing the remote loop back test is inputted through said input section and when said receiving section receives the instruction information;

a local loop back test execution section executing the local loop back test when the instruction signal for executing the local loop back test is inputted through said input section; and a light emitter control section lighting the light emitter when the instruction signal for executing the remote loop back test or the other instruction signal for executing the local loop back test is inputted through the input section and making the light emitter flash in accordance with a flashing cycle written in a memory area in the data modulator-demodulator when the receiving section receives the instruction information.

8. An indicating method using a light emitter in a data modulator-demodulator with a loop back test execution section executing a remote loop back test with another data modulator-demodulator, comprising:

a step of transmitting instruction information for executing the remote loop back test to the other data modulator-demodulator when an instruction signal for executing the remove loop back test is inputted; and a step of lighting the light emitter when the instruction signal is inputted or making the light emitter flash in accordance with a flashing cycle written in a memory area in the data modulator-demodulator when the instruction information is received from the other data modulator-demodulator.

* * * * *